US008241104B2

(12) United States Patent
Wolf

(10) Patent No.: US 8,241,104 B2
(45) Date of Patent: Aug. 14, 2012

(54) GAMING DEVICE AND METHOD HAVING DESIGNATED RULES FOR DETERMINING WAYS TO WIN

(75) Inventor: Bryan D. Wolf, Reno, NV (US)

(73) Assignee: IGT, Reno, NV (US)

( * ) Notice: Subject to any disclaimer, the term of this patent is extended or adjusted under 35 U.S.C. 154(b) by 1042 days.

(21) Appl. No.: 11/556,927

(22) Filed: Nov. 6, 2006

(65) Prior Publication Data

US 2008/0108408 A1 May 8, 2008

(51) Int. Cl.
*A63F 13/00* (2006.01)

(52) U.S. Cl. ................ 463/20; 463/16; 463/17; 463/18; 463/19; 463/21

(58) Field of Classification Search ............... 463/16–42
See application file for complete search history.

(56) References Cited

U.S. PATENT DOCUMENTS

| | | | |
|---|---|---|---|
| D164,309 | S | 8/1951 | McManus |
| D208,030 | S | 7/1967 | Weinard |
| 3,420,525 | A | 1/1969 | Waders |
| 3,642,287 | A | 2/1972 | Lally et al. |
| 3,667,757 | A | 6/1972 | Holmberg |
| 3,735,987 | A | 5/1973 | Ohki |
| 4,198,052 | A | 4/1980 | Gauselmann |
| D260,769 | S | 9/1981 | Thomas |
| 4,326,351 | A | 4/1982 | Heywood et al. |
| 4,410,178 | A | 10/1983 | Partridge |
| 4,448,419 | A | 5/1984 | Telnaes |
| 4,517,558 | A | 5/1985 | Davids |
| 4,618,150 | A | 10/1986 | Kimura |
| 4,624,459 | A | 11/1986 | Kaufman |
| 4,695,053 | A | 9/1987 | Vazquez, Jr. et al. |
| 4,732,386 | A | 3/1988 | Rayfiel |

(Continued)

FOREIGN PATENT DOCUMENTS

AU 199716432 B2 9/1997

(Continued)

OTHER PUBLICATIONS

"IGT Launches Its 25th Anniversary With Impressive Lineup of New Games and Products at Global Gaming Expo" from IGT, Sep. 7, 2005, http://phx.corporate-ir.net/phoenix.zhtml?c=119000&p=irol-newsArticle_print&ID=753618&highlight=.*

(Continued)

*Primary Examiner* — Ronald Laneau
*Assistant Examiner* — Justin Myhr
(74) *Attorney, Agent, or Firm* — Neal, Gerber & Eisenberg LLP

(57) ABSTRACT

A gaming device includes a game having a plurality of reels and a plurality of symbol positions associated with the reels. The gaming device activates a number of the symbol positions based on a wager by a player. The gaming generates and displays a symbol in each of the active symbol positions. In one embodiment, the gaming device analyzes the generated symbols to determine whether any of the generated symbols are related. If the gaming device determines that any of the generated symbols are related, the gaming device determines whether any of the related symbols form a string of related symbols according to one or more designated rules employed in the game. If one or more strings of related symbols are formed in the game, the gaming device determines if any of the strings of related symbols are associated with any awards and provides such awards to the player.

24 Claims, 22 Drawing Sheets

U.S. PATENT DOCUMENTS

| | | | |
|---|---|---|---|
| 4,756,531 | A | 7/1988 | DiRe et al. |
| 4,826,169 | A | 5/1989 | Bessho et al. |
| 4,836,553 | A | 6/1989 | Suttle et al. |
| 4,838,552 | A | 6/1989 | Hagiwara |
| 4,861,041 | A | 8/1989 | Jones et al. |
| 4,871,171 | A | 10/1989 | Rivero |
| 4,874,173 | A | 10/1989 | Kishishita |
| 4,978,129 | A | 12/1990 | Komeda et al. |
| 4,991,848 | A | 2/1991 | Greenwood et al. |
| 5,019,973 | A | 5/1991 | Wilcox et al. |
| 5,078,405 | A | 1/1992 | Jones et al. |
| 5,085,436 | A | 2/1992 | Bennett |
| 5,098,107 | A | 3/1992 | Boylan et al. |
| 5,102,134 | A | 4/1992 | Smyth |
| 5,102,137 | A | 4/1992 | Ekiert |
| 5,152,529 | A | 10/1992 | Okada |
| 5,209,479 | A | 5/1993 | Nagao et al. |
| 5,259,616 | A | 11/1993 | Bergmann |
| 5,308,065 | A | 5/1994 | Bridgeman et al. |
| 5,332,228 | A | 7/1994 | Schultz |
| 5,342,047 | A | 8/1994 | Heidel et al. |
| 5,342,049 | A | 8/1994 | Wichinsky et al. |
| 5,344,144 | A | 9/1994 | Canon |
| 5,364,100 | A | 11/1994 | Ludlow et al. |
| 5,393,057 | A | 2/1995 | Marnell, II |
| 5,393,061 | A | 2/1995 | Manship et al. |
| 5,395,111 | A | 3/1995 | Inoue |
| 5,423,539 | A | 6/1995 | Nagao |
| 5,431,408 | A | 7/1995 | Adams |
| 5,449,173 | A | 9/1995 | Thomas et al. |
| 5,524,888 | A | 6/1996 | Heidel |
| 5,542,669 | A | 8/1996 | Charron et al. |
| 5,569,084 | A | 10/1996 | Nicastro et al. |
| 5,580,053 | A | 12/1996 | Crouch |
| 5,580,055 | A | 12/1996 | Hagiwara |
| 5,584,764 | A | 12/1996 | Inoue |
| 5,609,524 | A | 3/1997 | Inoue |
| 5,611,535 | A | 3/1997 | Tiberio |
| 5,647,798 | A | 7/1997 | Falciglia |
| 5,697,843 | A | 12/1997 | Manship et al. |
| 5,704,835 | A | 1/1998 | Dietz, II |
| 5,722,891 | A | 3/1998 | Inoue |
| 5,752,881 | A | 5/1998 | Inoue |
| 5,766,074 | A | 6/1998 | Cannon et al. |
| 5,769,716 | A | 6/1998 | Saffari et al. |
| 5,772,506 | A | 6/1998 | Marks et al. |
| 5,772,509 | A | 6/1998 | Weiss |
| 5,775,692 | A | 7/1998 | Watts et al. |
| 5,788,573 | A | 8/1998 | Baerlocher et al. |
| 5,807,172 | A | 9/1998 | Piechowiak |
| 5,810,361 | A | 9/1998 | Kadlic |
| 5,816,915 | A | 10/1998 | Kadlic |
| 5,823,534 | A | 10/1998 | Banyai |
| 5,823,873 | A | 10/1998 | Moody |
| 5,823,874 | A | 10/1998 | Adams |
| D400,597 | S | 11/1998 | Hedrick et al. |
| 5,833,536 | A | 11/1998 | Davids et al. |
| 5,833,537 | A | 11/1998 | Barrie |
| 5,848,932 | A | 12/1998 | Adams |
| 5,851,148 | A | 12/1998 | Brune et al. |
| D404,084 | S | 1/1999 | Hedrick et al. |
| 5,863,249 | A | 1/1999 | Inoue |
| 5,868,618 | A | 2/1999 | Netley et al. |
| 5,868,619 | A | 2/1999 | Wood et al. |
| D406,615 | S | 3/1999 | Griswold et al. |
| 5,882,259 | A | 3/1999 | Holmes, Jr. et al. |
| 5,882,261 | A | 3/1999 | Adams |
| 5,890,962 | A | 4/1999 | Takemoto |
| 5,902,184 | A | 5/1999 | Bennett et al. |
| 5,919,088 | A | 7/1999 | Weiss |
| 5,927,714 | A | 7/1999 | Kaplan |
| 5,934,672 | A | 8/1999 | Sines et al. |
| 5,935,002 | A | 8/1999 | Falciglia |
| 5,944,315 | A | 8/1999 | Mostashari |
| 5,947,820 | A | 9/1999 | Morro et al. |
| 5,951,397 | A | 9/1999 | Dickinson |
| 5,976,016 | A | 11/1999 | Moody et al. |
| 5,980,384 | A | 11/1999 | Barrie |
| 5,984,781 | A | 11/1999 | Sunaga |
| 5,984,782 | A | 11/1999 | Inoue |
| 5,997,400 | A | 12/1999 | Seelig et al. |
| 5,997,401 | A | 12/1999 | Crawford |
| 6,003,867 | A | 12/1999 | Rodesch et al. |
| 6,004,207 | A | 12/1999 | Wilson, Jr. et al. |
| 6,004,208 | A | 12/1999 | Takemoto et al. |
| 6,015,346 | A | 1/2000 | Bennett |
| 6,027,115 | A | 2/2000 | Griswold et al. |
| 6,033,307 | A | 3/2000 | Vancura |
| 6,056,642 | A | 5/2000 | Bennett |
| 6,059,289 | A | 5/2000 | Vancura |
| 6,059,658 | A | 5/2000 | Mangano et al. |
| 6,062,980 | A | 5/2000 | Luciano |
| 6,086,066 | A | 7/2000 | Takeuchi et al. |
| 6,089,976 | A | 7/2000 | Schneider et al. |
| 6,089,977 | A | 7/2000 | Bennett |
| 6,089,978 | A | 7/2000 | Adams |
| 6,093,102 | A | 7/2000 | Bennett |
| 6,095,921 | A | 8/2000 | Walker et al. |
| 6,102,798 | A | 8/2000 | Bennett |
| 6,113,098 | A | 9/2000 | Adams |
| 6,120,031 | A | 9/2000 | Adams |
| 6,120,377 | A | 9/2000 | McGinnis, Sr. et al. |
| 6,120,378 | A | 9/2000 | Moody |
| 6,123,333 | A | 9/2000 | McGinnis, Sr. et al. |
| 6,126,542 | A | 10/2000 | Fier |
| 6,135,884 | A | 10/2000 | Hedrick et al. |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,149,521 | A | 11/2000 | Sandusky |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,165,070 | A | 12/2000 | Nolte et al. |
| 6,168,520 | B1 | 1/2001 | Baerlocher et al. |
| 6,174,233 | B1 | 1/2001 | Sunaga et al. |
| 6,174,234 | B1 | 1/2001 | Seibert et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,200,217 | B1 | 3/2001 | Osawa |
| 6,203,429 | B1 | 3/2001 | Demar et al. |
| 6,203,430 | B1 | 3/2001 | Walker et al. |
| 6,210,279 | B1 | 4/2001 | Dickinson |
| 6,213,876 | B1 | 4/2001 | Moore, Jr. |
| 6,220,959 | B1 | 4/2001 | Holmes, Jr. et al. |
| 6,224,483 | B1 | 5/2001 | Mayeroff |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,241,607 | B1 | 6/2001 | Payne et al. |
| 6,251,013 | B1 | 6/2001 | Bennett |
| 6,261,177 | B1 | 7/2001 | Bennett |
| 6,261,178 | B1 | 7/2001 | Bennett |
| 6,270,409 | B1 | 8/2001 | Shuster |
| 6,270,411 | B1 | 8/2001 | Gura et al. |
| 6,270,412 | B1 | 8/2001 | Crawford et al. |
| 6,290,600 | B1 | 9/2001 | Glasson |
| 6,299,165 | B1 | 10/2001 | Nagano |
| 6,299,170 | B1 | 10/2001 | Yoseloff |
| 6,302,398 | B1 | 10/2001 | Vecchio |
| 6,302,790 | B1 | 10/2001 | Brossard |
| 6,309,299 | B1 | 10/2001 | Weiss |
| 6,309,300 | B1 | 10/2001 | Glavich |
| 6,311,976 | B1 | 11/2001 | Yoseloff et al. |
| 6,312,334 | B1 | 11/2001 | Yoseloff |
| 6,315,660 | B1 | 11/2001 | DeMar et al. |
| 6,315,663 | B1 | 11/2001 | Sakamoto |
| 6,315,664 | B1 | 11/2001 | Baerlocher et al. |
| 6,319,124 | B1 | 11/2001 | Baerlocher |
| 6,322,078 | B1 | 11/2001 | Adams |

| | | | | |
|---|---|---|---|---|
| 6,328,649 | B1 | 12/2001 | Randall et al. | |
| 6,334,814 | B1 | 1/2002 | Adams | |
| 6,336,860 | B1 | 1/2002 | Webb | |
| 6,346,043 | B1 | 2/2002 | Colin et al. | |
| 6,347,996 | B1 | 2/2002 | Gilmore et al. | |
| 6,358,144 | B1 | 3/2002 | Kadlic et al. | |
| 6,358,147 | B1 | 3/2002 | Jaffe et al. | |
| 6,364,314 | B1 | 4/2002 | Canterbury | |
| 6,364,766 | B1 | 4/2002 | Anderson et al. | |
| 6,375,570 | B1 | 4/2002 | Poole | |
| 6,394,902 | B1 | 5/2002 | Glavich et al. | |
| 6,398,218 | B1 | 6/2002 | Vancura | |
| 6,398,220 | B1 | 6/2002 | Inoue | |
| 6,413,162 | B1 | 7/2002 | Baerlocher et al. | |
| 6,419,579 | B1 | 7/2002 | Bennett | |
| 6,435,511 | B1 | 8/2002 | Vancura et al. | |
| 6,439,943 | B1 | 8/2002 | Aoki et al. | |
| 6,439,993 | B1 | 8/2002 | O'Halloran | |
| 6,439,995 | B1 | 8/2002 | Hughs-Baird et al. | |
| 6,454,266 | B1 | 9/2002 | Breeding et al. | |
| 6,457,714 | B1 * | 10/2002 | Feola | 273/274 |
| 6,461,241 | B1 | 10/2002 | Webb et al. | |
| 6,464,581 | B1 | 10/2002 | Yoseloff et al. | |
| 6,471,208 | B2 | 10/2002 | Yoseloff et al. | |
| 6,491,584 | B2 | 12/2002 | Graham et al. | |
| 6,494,454 | B2 | 12/2002 | Adams | |
| 6,517,432 | B1 | 2/2003 | Jaffe | |
| 6,547,242 | B1 | 4/2003 | Sugiyama et al. | |
| 6,551,187 | B1 | 4/2003 | Jaffe | |
| 6,558,254 | B2 | 5/2003 | Baelocher et al. | |
| 6,561,900 | B1 | 5/2003 | Baerlocher et al. | |
| 6,569,015 | B1 | 5/2003 | Baerlocher et al. | |
| 6,575,830 | B2 | 6/2003 | Baerlocher et al. | |
| 6,589,114 | B2 | 7/2003 | Rose | |
| 6,595,854 | B2 | 7/2003 | Hughs-Baird et al. | |
| 6,602,137 | B2 | 8/2003 | Kaminkow et al. | |
| 6,604,740 | B1 | 8/2003 | Singer et al. | |
| 6,604,999 | B2 | 8/2003 | Ainsworth | |
| 6,605,002 | B2 | 8/2003 | Baerlocher | |
| 6,609,971 | B2 | 8/2003 | Vancura | |
| 6,616,142 | B2 | 9/2003 | Adams | |
| 6,632,139 | B1 | 10/2003 | Baerlocher | |
| 6,634,945 | B2 | 10/2003 | Glavich et al. | |
| 6,659,864 | B2 | 12/2003 | McGahn et al. | |
| 6,676,512 | B2 | 1/2004 | Fong et al. | |
| D487,582 | S | 3/2004 | McGahn et al. | |
| 6,715,756 | B2 | 4/2004 | Inoue | |
| 6,726,204 | B2 | 4/2004 | Inoue | |
| 6,854,732 | B2 | 2/2005 | Moody | |
| 6,855,056 | B2 | 2/2005 | Inoue | |
| 6,869,357 | B2 | 3/2005 | Adams et al. | |
| D504,473 | S | 4/2005 | Baerlocher | |
| 6,880,826 | B2 | 4/2005 | Inoue | |
| 6,893,018 | B2 | 5/2005 | Inoue | |
| 6,896,615 | B2 * | 5/2005 | Berman | 463/20 |
| 6,896,617 | B2 | 5/2005 | Daly | |
| 6,960,133 | B1 | 11/2005 | Marks et al. | |
| 7,001,274 | B2 | 2/2006 | Baerlocher et al. | |
| 7,014,560 | B2 | 3/2006 | Glavich et al. | |
| 2001/0054794 | A1 | 12/2001 | Cole et al. | |
| 2002/0025844 | A1 | 2/2002 | Casey et al. | |
| 2002/0055382 | A1 | 5/2002 | Meyer | |
| 2002/0094857 | A1 | 7/2002 | Meyer | |
| 2002/0094862 | A1 | 7/2002 | Inoue | |
| 2002/0142829 | A1 | 10/2002 | Inoue | |
| 2002/0193160 | A1 | 12/2002 | Tarantino | |
| 2003/0013518 | A1 | 1/2003 | Graham | |
| 2003/0040355 | A1 | 2/2003 | Baerlocher | |
| 2003/0045345 | A1 | 3/2003 | Berman | |
| 2003/0092480 | A1 | 5/2003 | White et al. | |
| 2003/0203752 | A1 | 10/2003 | Kaminkow et al. | |
| 2003/0216165 | A1 | 11/2003 | Singer et al. | |
| 2003/0232643 | A1 | 12/2003 | Inoue | |
| 2004/0000754 | A1 | 1/2004 | Inoue | |
| 2004/0009803 | A1 | 1/2004 | Bennett et al. | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0017041 | A1 | 1/2004 | Inoue | |
| 2004/0018866 | A1 | 1/2004 | Inoue | |
| 2004/0023714 | A1 | 2/2004 | Asdale | |
| 2004/0026854 | A1 | 2/2004 | Inoue | |
| 2004/0033829 | A1 * | 2/2004 | Pacey et al. | 463/20 |
| 2004/0036218 | A1 | 2/2004 | Inoue | |
| 2004/0038726 | A1 | 2/2004 | Inoue | |
| 2004/0041340 | A1 | 3/2004 | Inoue | |
| 2004/0048650 | A1 | 3/2004 | Mierau et al. | |
| 2004/0053658 | A1 | 3/2004 | Rothranz | |
| 2004/0097280 | A1 | 5/2004 | Gauselmann | |
| 2004/0121840 | A1 | 6/2004 | Rosander et al. | |
| 2004/0155399 | A1 | 8/2004 | Inoue | |
| 2004/0183251 | A1 | 9/2004 | Inoue | |
| 2004/0192431 | A1 | 9/2004 | Singer et al. | |
| 2004/0195773 | A1 | 10/2004 | Masci et al. | |
| 2004/0242313 | A1 | 12/2004 | Munoz | |
| 2004/0242314 | A1 | 12/2004 | Casey | |
| 2004/0259628 | A1 | 12/2004 | Randall | |
| 2005/0043083 | A1 | 2/2005 | Inoue | |
| 2005/0043084 | A1 | 2/2005 | Inoue | |
| 2005/0059478 | A1 | 3/2005 | Peterson et al. | |
| 2005/0192081 | A1 | 9/2005 | Marks et al. | |
| 2005/0277460 | A1 | 12/2005 | Inoue | |
| 2005/0282620 | A1 | 12/2005 | Marks et al. | |
| 2005/0288094 | A1 | 12/2005 | Marks et al. | |
| 2006/0019738 | A1 | 1/2006 | Baerlocher et al. | |
| 2006/0030392 | A1 * | 2/2006 | Rodgers et al. | 463/16 |
| 2006/0040728 | A1 | 2/2006 | Fuller | |
| 2006/0046830 | A1 | 3/2006 | Webb | |
| 2006/0084492 | A1 | 4/2006 | Baerlocher et al. | |
| 2006/0111173 | A1 | 5/2006 | Yang | |
| 2006/0121969 | A1 * | 6/2006 | Marks et al. | 463/16 |
| 2007/0060255 | A1 * | 3/2007 | Baerlocher et al. | 463/16 |
| 2007/0077980 | A1 | 4/2007 | Marks et al. | |
| 2007/0173315 | A1 * | 7/2007 | Law | 463/20 |
| 2008/0132320 | A1 | 6/2008 | Rodgers | |
| 2008/0161097 | A1 | 7/2008 | Baerlocher et al. | |

FOREIGN PATENT DOCUMENTS

| | | | |
|---|---|---|---|
| AU | 199717601 | B2 | 9/1997 |
| AU | A-50327/96 | | 10/1997 |
| AU | 199747657 | B2 | 6/1998 |
| AU | 199917318 | B2 | 9/1999 |
| DE | 25 29 930 | | 12/1976 |
| DE | 79 31 812 | | 2/1980 |
| DE | 31 05 266 | A1 | 9/1982 |
| DE | 37 00 861 | A1 | 7/1988 |
| DE | 42 26 873 | | 11/1990 |
| EP | 0 060 019 | A1 | 9/1982 |
| EP | 0 238 289 | A3 | 9/1987 |
| EP | 0 410 789 | A2 | 7/1990 |
| EP | 0 798 676 | A1 | 10/1997 |
| EP | 0 926 645 | A3 | 6/1999 |
| EP | 0 944 030 | A3 | 9/1999 |
| EP | 0 945 837 | A2 | 9/1999 |
| EP | 0 984 408 | A2 | 3/2000 |
| EP | 1 205 894 | A2 | 10/2001 |
| EP | 1 184 822 | A2 | 3/2002 |
| EP | 1 296 296 | A2 | 3/2003 |
| GB | 1 464 896 | A | 1/1974 |
| GB | 2 083 936 | A | 3/1982 |
| GB | 2 090 690 | A | 7/1982 |
| GB | 2 096 376 | A | 10/1982 |
| GB | 2 097 160 | A | 10/1982 |
| GB | 2 100 905 | A | 1/1983 |
| GB | 2 101 380 | A | 1/1983 |
| GB | 2 105 891 | A | 3/1983 |
| GB | 2 106 292 | A | 4/1983 |
| GB | 2 117 155 | A | 10/1983 |
| GB | 2 137 392 | A | 10/1984 |
| GB | 2 161 008 | A | 1/1986 |
| GB | 2 170 636 | A | 8/1986 |
| GB | 2 170 643 | A | 8/1986 |
| GB | 2 180 087 | A | 3/1987 |
| GB | 2 181 589 | A | 4/1987 |
| GB | 2 183 882 | A | 6/1987 |
| GB | 2 191 030 | A | 12/1987 |
| GB | 2 222 712 | A | 3/1990 |
| GB | 2 225 889 | A | 6/1990 |

| | | | |
|---|---|---|---|
| GB | 2 226 436 | A | 6/1990 |
| GB | 2 226 907 | A | 7/1990 |
| GB | 2 242 300 | A | 9/1991 |
| GB | 2 262 642 | A | 6/1993 |
| GB | 2 328 311 | A | 2/1999 |
| GB | 2 393 019 | A | 3/2004 |
| WO | WO 97/32285 | | 9/1997 |
| WO | WO 00/59591 | | 10/2000 |
| WO | WO 00/66235 | | 11/2000 |
| WO | WO 00/76606 | A1 | 12/2000 |
| WO | WO 01/19476 | A1 | 3/2001 |
| WO | WO 01/87441 | A1 | 11/2001 |
| WO | WO 03/049055 | A3 | 3/2003 |
| WO | WO 03/026758 | A1 | 4/2003 |
| WO | WO 2004/025584 | A2 | 3/2004 |
| WO | WO 2005/010831 | A2 | 6/2004 |
| WO | WO 2004/082779 | A2 | 9/2004 |
| WO | WO 2005/058444 | A1 | 12/2004 |
| WO | WO 2005/009560 | A2 | 2/2005 |
| WO | 2007084866 | | 7/2007 |

OTHER PUBLICATIONS

Arcade-History.com listing of Aristocrat gaming device with release dates, printed Feb. 15, 2006.
Austin Powers in Goldmember™ Advertisement, written by IGT, available in 2003.
Aztec Temple Multiway Article, written by IGT, published in Strictly Slots Aug. 2005.
Aztec Temple Multiway Enhanced Video Slots Advertisement, written by IGT, available in 2005.
Barn Yard Advertisement, written by Aristocrat Technologies Inc., published prior to Nov. 6, 2006.
Barn Yard Article, published in Strictly Slots Mar. 2002.
Black Rhino game description, printed from Arcade-History.com on Feb. 6, 2006.
Bonus Times Article, written by Bally Gaming, published in Strictly Slots Jul. 2000.
Boot Scootin Article, written by Aristocrat Technologies, published in Strictly Slots Apr. 2001.
Carnival of Mystery Multiway Advertisement, written by IGT, available in 2005.
Dolphin Treasure Advertisement, written by Aristocrat, published in Jul. 1993.
Easy Street Article, published in Strictly Slots Jul. 2000.
Easy Street™, [online] [printed on Jan. 15, 2001]. Retrieved from the Internet at <URL: http://www.csds.com/Gaming/Products/g_Easy.htm.
Golden Canaries game description, printed from Arcade-History.com on Feb. 6, 2006.
The iGame Series, written by IGT, available prior to Nov. 6, 2006.
Jackpot Party Brochure and Articles, written by WMS Gaming, Inc., published in Mar. 1998.
Jewel in the Crown Advertisement, written by IGT, available in 1999.
Joker's Wild Advertisement, written by IGT, published prior to Nov. 6, 2006.
Jolly Joker game specification, written by Barcrest, published in Jul. 1993.
Let the Games Begin Advertisement, written by Aristocrat, published prior to Nov. 6, 2006.
Magic 8 Ball Advertisement, written by IGT, available in 2002.
Multi-Way Description, printed from www.igt.com/GamingGroup/Games/base.asp?pid-5.20 on May 3, 2005.
Multiway Wagering Advertisement, written by IGT, available in 2005.
Munsters Article, written by IGT, published in Strictly Slots Apr. 2001.
Money Honey Advertisement, written by Aristocrat, published in 2004.
On the Money Advertisement, written by Casino Data Systems, published in Strictly Slots Dec. 2000.
Pictures of various co-IGT and Aristocrat gaming devices, available prior to Nov. 6, 2006.
Reel 'Em In® Brochure, written by WMS Gaming, available Sep. 10, 2001.
Reelin-n-Rockin Advertisement, written by Aristocrat, available in 1999.
Reel Power and Super Reel Power Advertisements, written by Aristocrat, available in 2004.
Response to Dec. 2003 Final Office Action for U.S. Published Patent Application No. 2002/0039920.
"Slot Machines," written by Marshall Fey, published in 1989.
SnapShot Article, written by Aristocrat Technologies, published Strictly Slots in Aug. 2003.
Summary Judgment Order from *Aristocrat Technologies Australia Pty Limited, and Aristocrat Technologies, Inc.*, v. *International Game Technology and IGT*; U.S. District Court, District of Nevada, 2:05-CV-00820-BES (LRL), dated Apr. 20, 2007.
Supertimes Pay Poker Advertisement, written by IGT, available in 2003.
Sweet Hearts II game description, printed from Arcade-History.com on Feb. 6, 2006.
Take Your Pick Article, written by Anchor Games, published in Strictly Slots Mar. 2001.
Totem Pole Advertisement written by IGT, published in 1997.
Turbo Reel Article (with translation), published in Automaten Magazine Dec. 1989.
Turbo Reel Article with translation), written by Barcrest, published in Automaten Magazine Jan. 1990.
Vision Series™/Good Times™ Advertisement, written by IGT, available in 1999.
Wheel of Fortune Advertisement, written by IGT, available in 2002.
Wild Streak Article, written by WMS Gaming, published in Strictly Slots Mar. 2001.
Wizard Ways game description, printed from Arcade-History.com on Feb. 15, 2006.
X Factor Advertisement, written by WMS Gaming, Inc., published in 1998.
Pharoah's Gold Multi-way Video Slots Game Description, written by IGT, printed from https://www.igt.com/GamingGroup/Games/game_detail.asp?toggle=ovr&pid=5&type_id=3734&pl=#cnt on Apr. 22, 2009, available prior to Nov. 6, 2006.
Treasures of Troy® Video Slots Game Description, written by IGT, printed from https://www.igt.com/GamingGroup/Games/game_detail.asp?toggle=ovr&pid=5&type_id=4266&pl=#cnt, on Apr. 22, 2009, available prior to Nov. 6, 2006.
Cash Cover Multi-way Video Slots Game Description, written by IGT, printed from https://www.igt.com/GamingGroup/Games/game_detail.asp?toggle=ovr&pid=5.113.120&type_id=5919&pl=#cnt, on Apr. 22, 2009, available prior to Nov. 6, 2006.

* cited by examiner

GAMING DEVICE AND METHOD HAVING DESIGNATED RULES FOR DETERMINING WAYS TO WIN

CROSS REFERENCE TO RELATED APPLICATIONS

The present disclosure relates to the following co-pending commonly owned U.S. patent applications: "GAMING DEVICE AND METHOD HAVING INDEPENDENT REELS AND MULTIPLE WAYS OF WINNING," Ser. No. 11/466,010, and "GAMING DEVICE HAVING CONCENTRIC REELS INCLUDING AN OUTER REEL WITH DISPLAY AREAS HAVING DIFFERENT SIZES AND POSITIONS," Ser. No. 11/210,065.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make wagering gaming devices that provide as much enjoyment, entertainment and excitement as possible for players. Providing interesting and exciting primary or base games and secondary or bonus games in which a player has an opportunity to win potentially large awards or credits is one way to enhance player enjoyment and excitement. Certain known gaming devices use mechanical devices such as reels, wheels or spheres to enhance the attraction of the gaming machines to players and also to enhance the player's game playing experience. These mechanical devices enable a player to see physical movements of a game, a portion of a game, or a functional game event or element which increases the player's enjoyment of the game.

In one known slot gaming device, the gaming device includes a plurality of reels and one or more paylines. Such gaming devices include any suitable number of reels, such as three to five reels, which each display any suitable number of symbols per reel, such as three symbols per reel. In these gaming devices, the player initiates the spinning of the reels by making one or more wagers on one or more paylines. Such gaming devices may have one, three, five, nine, fifteen, twenty-five or any other suitable number of paylines which are horizontal, vertical, diagonal or any combination thereof. One type of gaming device includes a payline associated with each possible combination of symbol positions, wherein each payline passes through only one symbol position on each reel. The player wagers on a player selected number or combination of paylines, such as one, two, three, five, ten or fifteen paylines and the reels are activated to spin.

The reels spin and generate a plurality of symbols, and the gaming device analyzes the generated symbols to determine if the gaming device has randomly generated a winning symbol or winning symbol combination on or along one or more of the wagered on paylines. Any awards associated with any generated winning symbols or winning symbol combinations generated along any wagered on paylines are provided to the player.

In these gaming devices, the awards provided to the player are generally based on the number of paylines that pass through each of the winning symbol combinations. That is, the gaming device separately analyzes each wagered on payline to determine if a winning symbol combination is generated on that payline. For each occurrence of each payline passing through a winning symbol combination, the gaming device provides the player the award associated with that winning symbol combination. For example, in a five reel gaming device, if four related symbols (which form a winning symbol combination) are generated by the first four reels and twelve paylines pass through the first three of those related symbols (i.e., three paylines running left to right pass through all four related symbols and nine paylines running left to right pass through the first three related symbols), the gaming device provides the player twelve awards (i.e., one award for each payline that passes through the winning symbol combination). These twelve separate awards are each for the single occurrence of the winning symbol combination including the four related symbols. Accordingly, in a gaming device with wagering on paylines, the greater the number of wagered on paylines that pass through a winning symbol combination, the greater the award as compared to an identical winning symbol combination in which fewer wagered on paylines pass through the same winning symbol combination.

In another type of gaming device with reels, the player wagers on a number of ways to win, wherein any award provided to the player is based on the number of associated symbols which are generated in active symbol positions on a requisite number of adjacent reels. In such ways to win gaming devices, the gaming device determines any outcome to provide to the player based on the number of associated symbols which are generated in active symbol positions on a requisite number of adjacent reels (i.e., not on paylines passing through any displayed winning symbol combinations).

In some known ways to win gaming devices, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). Modifying the number of generated symbols by either modifying the number of reels or modifying the number of symbols generated in active symbol positions by one or more of the reels, modifies the number of ways to win.

A need exists to provide a gaming device which allows for simpler play by restricting the number of ways to win in a game by adhering to more intuitive rules.

SUMMARY

The present disclosure is directed to a gaming device which employs one or more designated structures or rules for determining a number of ways to win in a game. In one embodiment, the gaming device determines the number of ways to win in a game based on the number of related symbols which are generated on a requisite number of adjacent reels. In this embodiment, according to one rule which may be employed in the game, related symbols in adjacent reels must be in the same row or in adjacent rows to form a way to win. According to another rule, a symbol which is in an adjacent reel to a related symbol must be in the same row or in a lower row to form a way to win. According to another rule, related symbols must be in a symmetric arrangement on the reels to form a way to win.

In one embodiment, the gaming device will apply a designated number or quantity of these designated rules in analyzing the symbols to determine whether any ways to win are formed. The designated number will be at least one. Using one or more of these designated rules limits the number of ways to win in the game. As a result, in such ways to win games, the gaming device performs fewer evaluations and the process of determining awards occurs faster.

In one embodiment, the gaming device includes a plurality of reels, each of the reels having a plurality of symbols. The gaming device includes a plurality of symbol positions associated with the reels. A symbol can be displayed at each symbol position. In one embodiment, the symbol positions are arranged in an array of columns and rows.

In one embodiment, the gaming device enables a player to wager on one or more ways to win in the game. The possible number of ways to win in a game depends on the designated rule or rules employed in the game. After receiving the player's wager on a number of ways to win, the gaming device activates a number of symbol positions which corresponds to the number of wagered on ways to win. Symbols are subsequently generated and displayed in active symbol positions, and the gaming device determines any awards to provide to the player based on the number of related symbols displayed in active symbol positions on a requisite number of adjacent reels.

In one embodiment, the gaming device selects a number of symbol positions to activate from pre-programmed arrangements which correspond to the wagered on number of ways to win. In another embodiment, depending on the number of wagered on ways to win, the gaming device activates each of the symbol positions associated with one or more reels. In one such embodiment, for each reel that is not activated, the gaming device designates a number of default symbol positions to activate, such as the middle symbol position associated with each inactivated reel, and such activated default symbol position(s) are evaluated with the active symbol positions to determine if related symbols are generated on a requisite number of adjacent reels.

In one preferred embodiment, the gaming device includes five reels, each of the reels associated with three symbol positions. In this embodiment, the gaming device employs a rule which requires that related symbols on adjacent reels be displayed in active symbol positions that are in the same row or in adjacent rows. This rule is referred to herein as the same/adjacent row rule. In such an embodiment, there are 99 possible ways to win in the game. The gaming device enables the player to wager on a number of ways to win in the game, up to the maximum of 99 ways to win. After receiving the player's wager on a number of ways to win, the gaming device activates a number of symbol positions which corresponds to the number of wagered on ways to win, as will be discussed in more detail below.

Once the player has wagered on a number of ways to win and an appropriate number of symbol positions are activated, the gaming device activates the reels to generate and display one of the symbols in each of the active symbol positions. In different embodiments, (1) no symbols are generated and displayed at any of the inactive symbol positions, or (2) any symbols generated at any inactive symbol positions are displayed to the player but are suitably designated as inactive, such as by shading the inactive symbols.

In one embodiment, the gaming device determines any award to provide to the player based on the number of related symbols which are generated on a requisite number of adjacent reels in active symbol positions, and not based on displayed winning symbol combinations indicated on any paylines. In this embodiment, the gaming device analyzes the symbols generated and displayed in the active symbol positions to determine whether related symbols form a string of related symbols according to one or more of the designated rules employed in the game.

Each string of related symbols includes a symbol from each of a requisite number of adjacent reels. As described below, if symbols from adjacent reels are related and correspond with any applicable designated rule employed in the game, the symbols form a string of related symbols. If one or more strings of related symbols are formed in the game, the gaming device evaluates the symbols of each string of related symbols to determine whether those symbols correspond to any winning combinations of symbols. If so, the gaming device provides any outcomes, such as awards, associated with such winning combinations of symbols to the player. Thus, the number of ways to win in the game depends on the number of strings of related symbols that, according to one or more designated rules employed in the game, are formed and evaluated by the gaming device for winning symbol combinations.

In one embodiment, the gaming device includes a plurality of reels, including at least a first reel and a second reel, wherein each reel includes a plurality of symbols. The reels are associated with a plurality of symbol positions. The gaming device enables a player to wager on a number of ways to win in the game. After receiving the player's wager, the gaming device activates a number of symbol positions which corresponds to the number of wagered on ways to win. The gaming device activates the reels to generate and display one of the symbols in each of the active symbol positions.

The gaming device determines whether any of the symbols displayed in active symbol positions associated with the first reel are related to any of the symbols displayed in active symbol positions associated with the second reel. For a first symbol in an active symbol position associated with the first reel, the gaming device determines whether any symbols in any active symbol positions associated with the second reel are related to the first symbol. In one embodiment, symbols displayed in active symbol positions are related if they form part or all of a winning symbol combination or are otherwise suitably related.

If the first symbol in the active symbol position associated with the first reel and a symbol in an active symbol position associated with the second reel are related (i.e., form all or part of a winning symbol combination), the gaming device classifies such symbols as related symbols. The gaming device then determines whether these related symbols form a string of related symbols according to the designated rule or designated rules employed in the game. For example, according to the same/adjacent row rule, related symbols in adjacent reels must appear in active symbol positions that are in the same row or in adjacent rows to form a string of related symbols. That is, the gaming device forms a string of related symbols only if two related symbols in adjacent reels are in the same row or in adjacent rows. In another example, according to the same/lower row rule, a symbol that is adjacent to a related symbol in a previous reel must be on the same row or a lower row. In other words, the gaming device forms a string of related symbols only if a symbol in an adjacent reel to a related symbol is displayed in an active symbol position which is in the same row or in a lower row. In another example, according to the symmetric rule, related symbols must appear in active symbol positions that form a symmetric arrangement to form a string of related symbols.

It should be appreciated that any suitable designated rule or combination of designated rules can be applied for determining whether related symbols form a string of related symbols. For example, other possible designated rules include but are not limited to: (1) the same/higher row rule (a symbol that is in an adjacent reel to a related symbol must be in an active symbol position which is in the same row or a higher row); (2) the only lower row rule (a symbol that is adjacent to a related symbol in a previous reel must be in an active symbol position that is in a lower row); (3) the only higher row rule (a symbol that is adjacent to a related symbol in a previous reel must be in an active symbol position that is in a higher row); (4) the different row rule (related symbols in adjacent reels must appear in active symbol positions that are in different rows); (5) the one-row-removed rule (related symbols in adjacent reels must be at least one row apart); (6) the spiral rule (a related symbol must be in an active symbol position which is in the same row or a higher row than the previous related symbol to form a string of related symbols, wherein once a related symbol in the top symbol position of one of the reels is added to the string, a related symbol in the bottom symbol position of the next adjacent reel can be added to the string); and (7) the bounce rule (a related symbol must be in an active symbol position which is in the same row or a lower row than the previous related symbol to form a string of related symbols, wherein once a related symbol in the bottom symbol position of one of the reels is added to the string, a related symbol in the top symbol position of the next adjacent reel can be added to the string).

After determining whether the first symbol in the active symbol position associated with the first reel forms a string of related symbols with any symbols in the active symbol positions associated with the second reel, the gaming device repeats the process described above for any remaining symbols in one of the active symbol positions associated with the first reel.

For each classified string of related symbols, the gaming device determines whether any of the symbols generated in an active symbol position associated with the next adjacent reel (i.e., a third reel) are related to that string of related symbols. If none of the symbols in an active symbol position associated with the next adjacent reel are related to the string of related symbols, the gaming device marks or flags such string of related symbols complete. If a symbol in an active symbol position associated with the next adjacent reel is related to the symbols in the string of related symbols, the gaming device determines if that related symbol in the active symbol position associated with the adjacent reel can be added to the string of related symbols according to the designated rule or rules employed in the game. If the symbol displayed in the active symbol position associated with the adjacent reel is related to the symbols in the string of related symbols and can be added to the string of related symbols according to the designated rule or rules employed in the game, the gaming device adds this related symbol to the string of related symbols. If the related symbol in the active symbol position associated with the adjacent reel cannot be added to the string of related symbols because doing so would violate the designated rule or rules employed in the game, the gaming device designates that string of related symbols as complete.

This process is repeated until either each of the strings of related symbols is complete, or until there are no more reels adjacent to the last reel which includes one of the related symbols.

When each of the strings of related symbols is marked complete, the gaming device determines any outcomes, such as any awards, associated with any formed winning symbol combinations and provides any determined outcomes to the player. It should be appreciated that, in this embodiment, unlike a gaming device with paylines, any outcomes provided to the player are not determined based on the number of paylines which may pass through any displayed winning symbol combinations.

Since a player's award is based on the strings of related symbols formed according to one or more rules employed in the game, limiting the possible number of strings of related symbols to less than the total possible number of strings of related symbols by adhering to designated rules allows for simpler game play which is more understandable or intuitive for a typical player. Moreover, the processor of such a gaming device will have fewer evaluations to perform, an thus, the entire award determination process is quicker.

In an alternative embodiment, the gaming device applies one or more rules to determine a number of available paylines in a game. In this embodiment, the gaming device determines a number of available paylines in the game according to one or more rules employed in the game. For example, according to the same/adjacent row payline rule, an available payline includes one symbol position from each of the reels, and symbol positions associated with adjacent reels must be in the same row or in adjacent rows. In another example, according to the same/lower row payline rule, an available payline includes one symbol position from each of the reels, wherein a symbol position that is adjacent to another symbol position on a previous reel must be on the same row or a lower row. In another example, according to the symmetric payline rule, an available payline includes one symbol position from each of the reels, and the symbol positions must be situated in a symmetric arrangement.

In this embodiment, the gaming device enables the player to wager on one or more of the available paylines in the game. For each wagered-on payline, the gaming device evaluates the symbols displayed in the symbol positions that define that payline. That is, the gaming device determines whether the symbols displayed along each of the wagered-on paylines correspond to any winning symbol combinations. The gaming device provides to the player any outcome or award associated with such winning symbol combinations.

The rules employed by the gaming device limit the number of paylines that are available in the game. Limiting the number of available paylines by adhering to certain rules allows for simpler play and enables a player to more easily determine why they may be provided with an award.

Other objects, features and advantages will be apparent from the following detailed disclosure, taken in conjunction with the accompanying sheets of drawings, wherein like numerals refer to like parts, elements, components, steps and processes.

Additional features and advantages are described in, and will be apparent from, the following Detailed Description and the figures.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
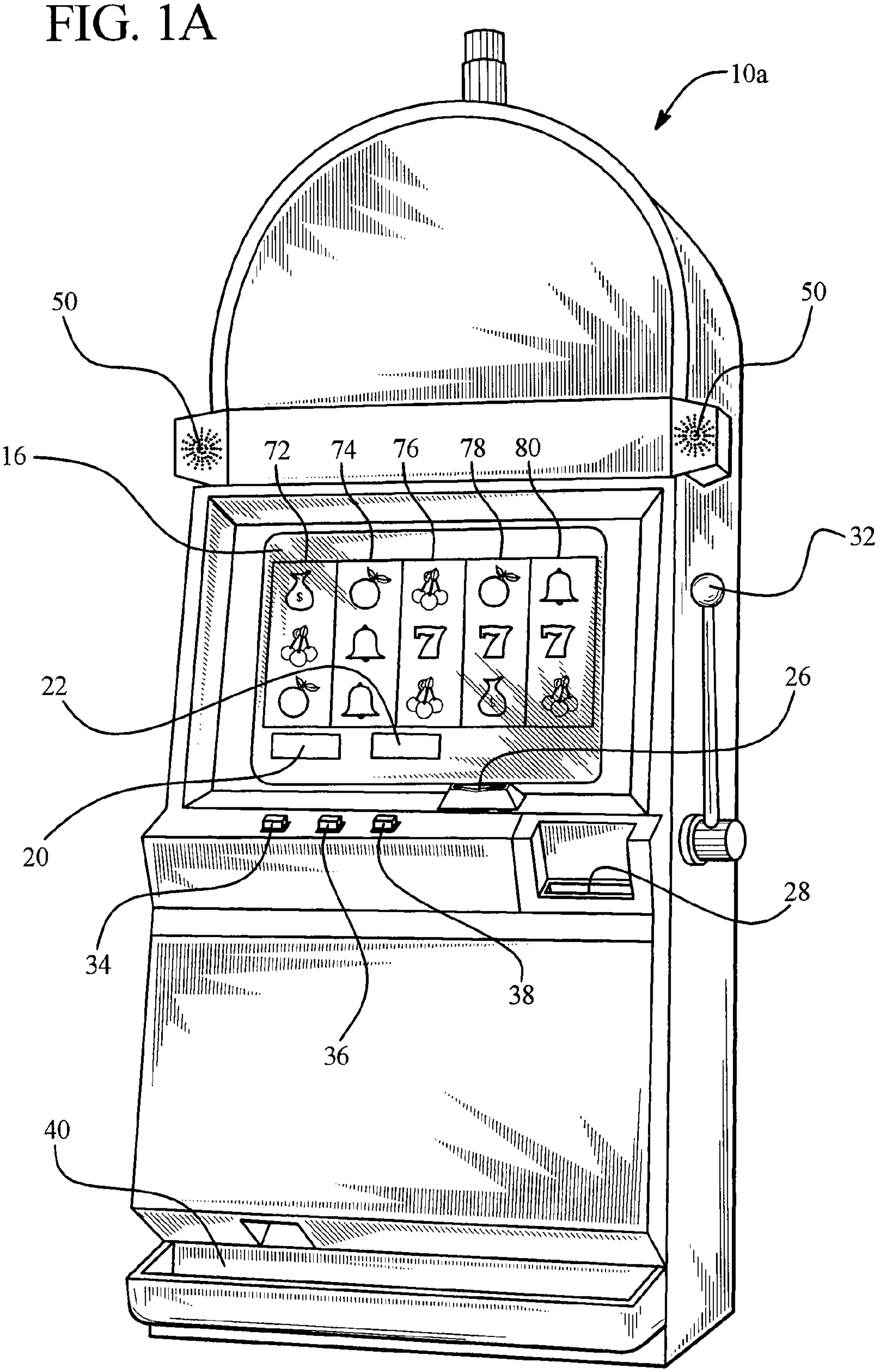
FIGS. 1A and 1B are perspective views of example alternative embodiments of the gaming device of the present disclosure.
Figure 1B:
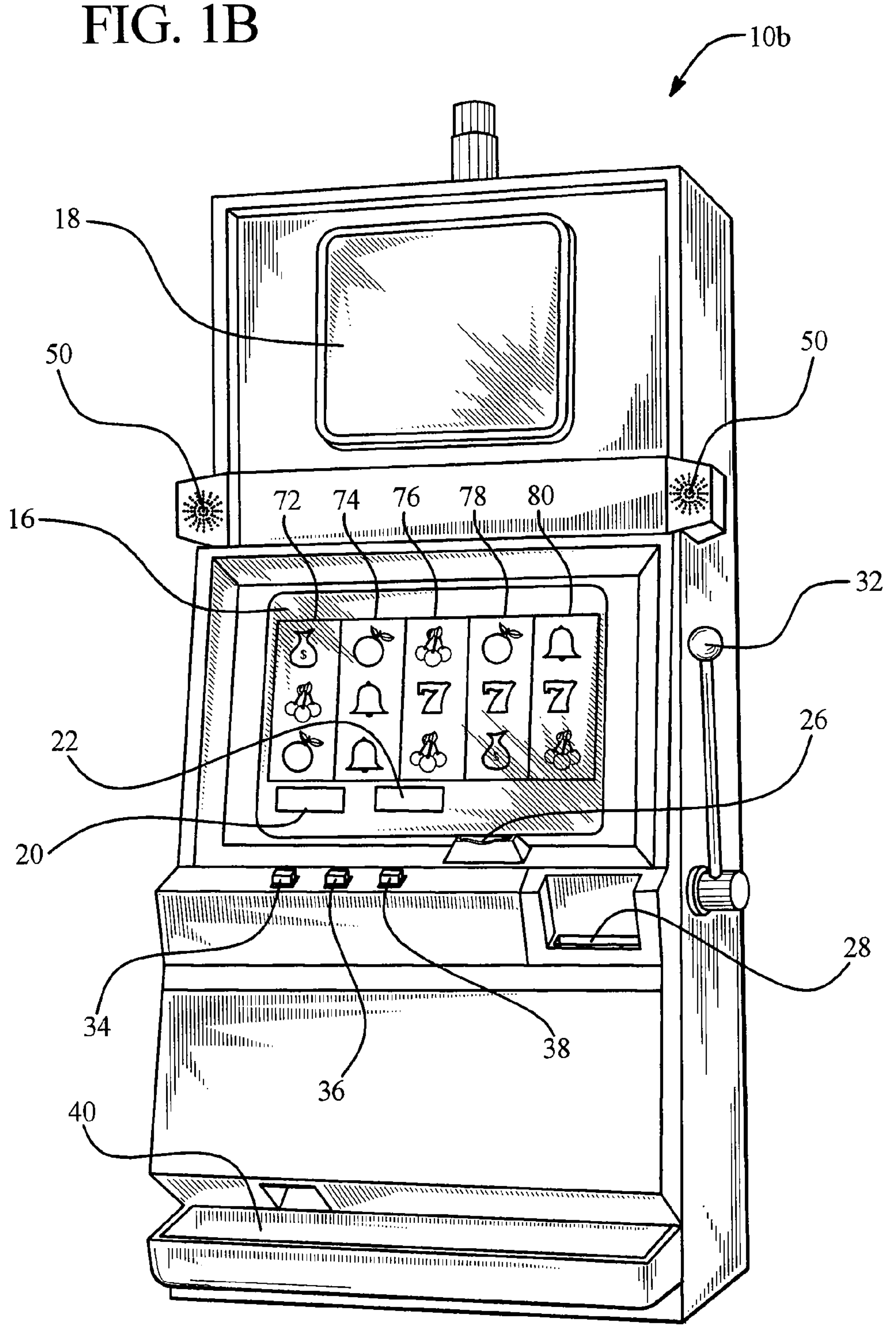

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
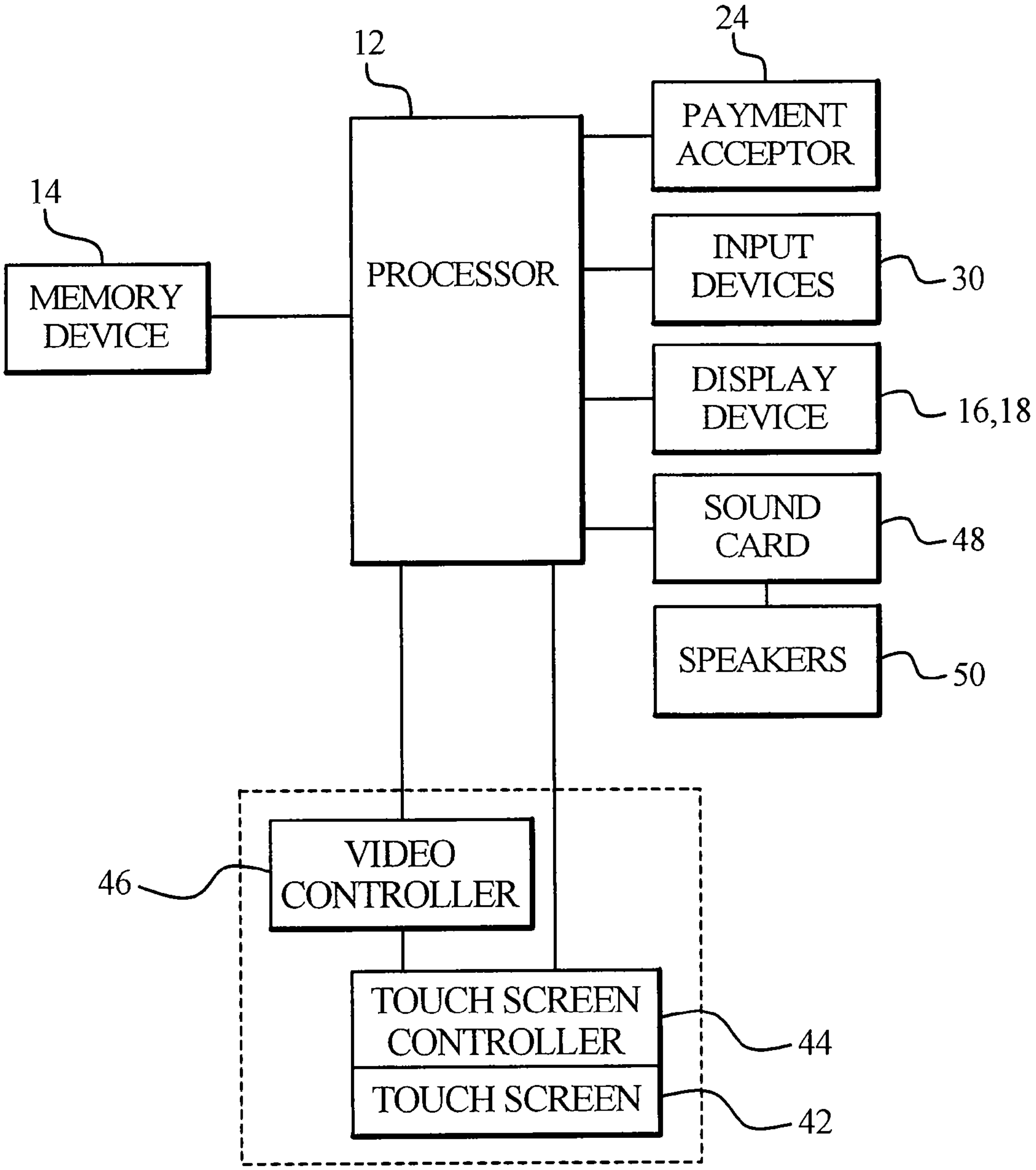
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

In one embodiment, the gaming device includes at least one and preferably a plurality of reels 72, 74, 76, 78, and 80, such as three to five reels, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 72, 74, 76, 78, and 80 are in video form, one or more of the display devices, as described above, display the plurality of simulated video reels 72, 74, 76, 78, and 80. Each reel 72, 74, 76, 78, and 80 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

In some embodiments, the ways to win game is applied to a secondary or bonus game, which is played in combination with a base or primary game. If the ways to win game is applied to a bonus game, it operates with one or more base or primary games. In different embodiments in which the ways to win game is a bonus game, different primary wagering games, such as slot games, video poker games, video blackjack games, video keno, video bingo, or any other suitable primary or base game may be implemented. In one embodiment, the base game is provided on the central display device 30, while the bonus game is played on the upper display device 32 (FIG. 1B).

In one such embodiment, if the ways to win game disclosed herein is implemented as a bonus game, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another such embodiment, if the ways to win game is implemented as a bonus game, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In another such embodiment, if the ways to win game is a bonus game, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. In such embodiments, the ways to win game disclosed herein is implemented as a primary or base game. For example, if the ways to win game is a primary game, achieving a certain qualifying condition or triggering event in the primary game triggers a separate bonus game. In some embodiments, if the ways to win game is applied to a base or primary game, the bonus game may be any type of suitable game, either similar to or completely different from the base or primary game.

The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
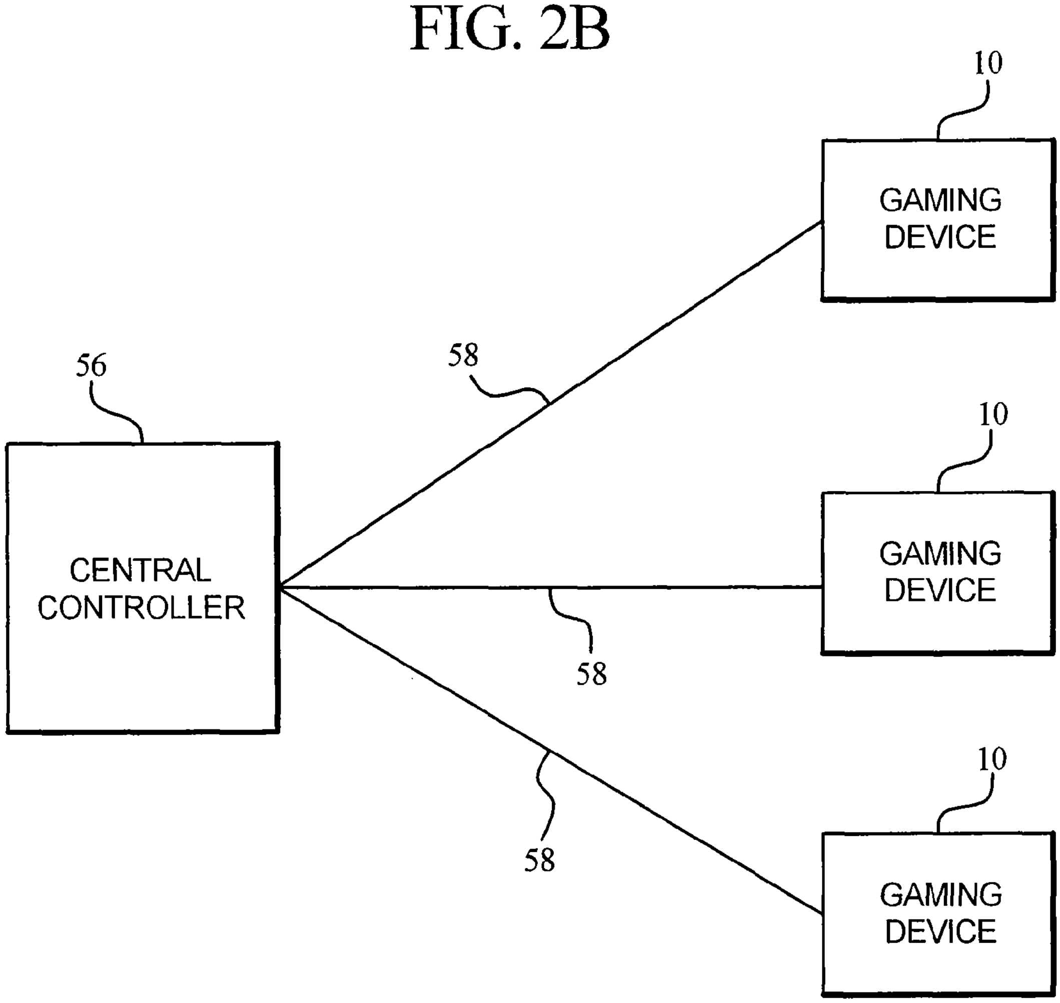
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Gaming Device Employing Designated Rules for Determining Ways to Win

Figure 3A:
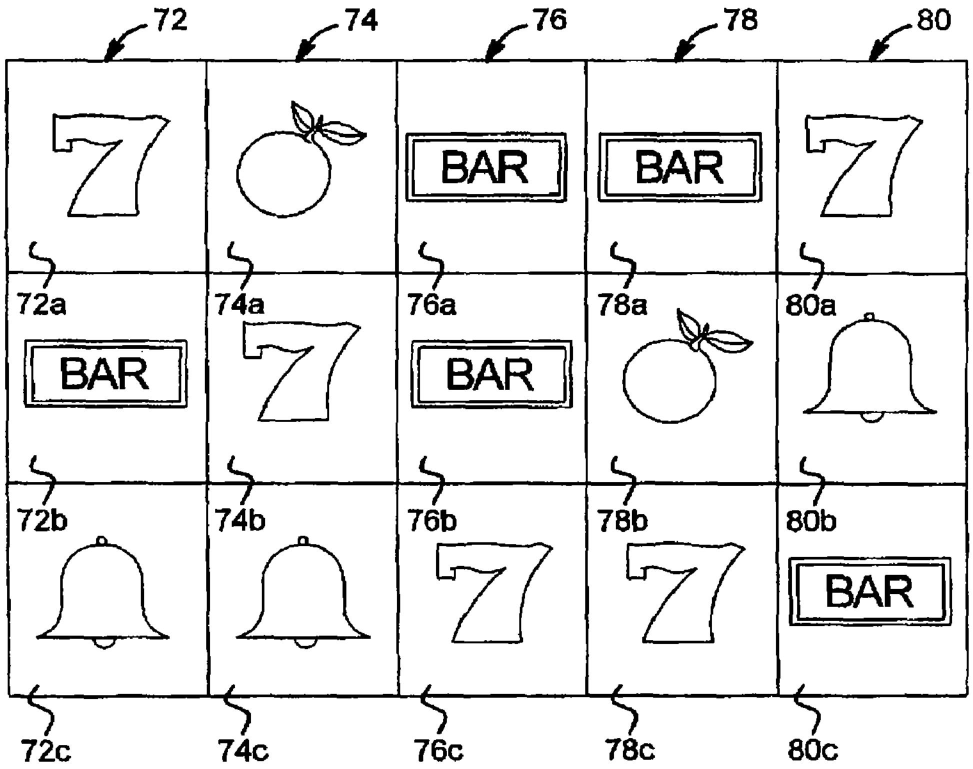
FIG. 3A is an enlarged front plan view of a reel configuration including five reels having three symbol positions associated with each reel.

Referring now to FIG. 3A, in one embodiment, the gaming device includes five reels 72, 74, 76, 78, and 80 and three symbol positions are associated with each reel (e.g., symbol positions 72*a*, 72*b*, and 72*c* are associated with reel 72). The gaming device employs one or more designated rules to determine a number of ways to win in a game. The designated rules limit the number of ways to win in the game, and employing one or more of these designated rules results in the gaming device performing fewer evaluations. As a result, the process of determining awards occurs faster.

In one embodiment, the gaming device enables a player to wager on one or more ways to win. The number of possible ways to win in a game depends on the designated rule or rules employed in the game. The gaming device activates a number of symbol positions corresponding to the wagered on number of ways to win.

In different embodiments, the determination of how many and/or which symbol positions to activate is predetermined, randomly determined, determined based on the player's status (such as determined through a player tracking system), determined based on a random determination by the central controller, determined based on a random determination at the gaming machine, determined based on one or more side wagers placed, determined based on the player's wager, determined based on time (such as the time of day) or determined based on any other suitable method or criteria.

In one embodiment, the gaming device selects a number of symbol positions to activate from pre-programmed arrangements which correspond to the wagered on number of ways to win. In another embodiment, the gaming device activates each of the symbol positions associated with one or more reels. In one such embodiment, for each reel that is not activated, the gaming device designates a number of default symbol positions to activate, such as the middle symbol position associated with each inactivated reel or reel column, and such activated default symbol position(s) are evaluated with the player-selected active symbol positions to determine whether any ways of winning are formed.

In one embodiment, the gaming device utilizes shading or other masking techniques of the non-active symbol positions to provide that different reels may generate or display different numbers of symbols. It should be appreciated that such shading techniques may be employed with physical reels, such as mechanical or electromechanical reels, or with virtual or video reels displayed on one or more display devices in any suitable manner.

The gaming device generates and displays a symbol in each of the active symbol positions. It should be appreciated that symbols may be generated and displayed in any of the symbol positions, including the inactive symbol positions. However, the gaming device analyzes the symbols displayed in active symbol positions to determine whether any of the generated symbols are related and whether any such related symbols form a string of related symbols according to one or more designated rules employed in the game.

For example, for a first symbol in an active symbol position associated with the first reel 72, the gaming device determines whether any symbols in any active symbol positions associated with the second reel 74 are related to the first symbol. In one embodiment, symbols displayed in active symbol positions are related if they form part or all of a winning symbol combination or are otherwise suitably related.

If the first symbol in the active symbol position associated with the first reel 72 and one of the symbols in an active symbol position associated with the second reel 74 are related (i.e., form all or part of a winning symbol combination), the gaming device classifies such symbols as related symbols. The gaming device then determines whether these related symbols form a string of related symbols according to the designated rule or rules employed in the game.

The gaming device may employ any suitable designated rule or combination of designated rules to determine whether related symbols form a string of related symbols. For example, according to the same/adjacent row rule, related symbols in adjacent reels must appear in active symbol positions that are in the same row or in adjacent rows to form a string of related symbols. In another example, according to the same/lower row rule, a symbol in an active symbol position that is adjacent to a related symbol in an active symbol position associated with a previous reel must be on the same row or a lower row. In another example, according to the symmetric rule, related symbols must be displayed in active symbol positions that are in a symmetric arrangement to form string of related symbols.

In one alternative embodiment, the gaming device evaluates the active symbol positions and the symbols displayed in those active symbol positions in the reverse order. That is, the gaming device first determines whether an active symbol position associated with the first reel and an active symbol position associated with the second reel satisfy the designated rule or rules employed in the game (e.g., under the same/adjacent row rule, whether active symbol positions on adjacent reels are in the same or adjacent rows). If it is determined that the active symbol position associated with the first reel and the active symbol position associated with the second reel satisfy the designated rule or rules, the gaming device determines whether the symbols displayed in those symbol positions are related. If the symbols displayed in those symbol positions are related, these related symbols form a string of related symbols.

Other possible rules may include but are not limited to: (1) the same/higher row rule (a symbol that is in an adjacent reel to a related symbol must be in an active symbol position which is in the same row or a higher row); (2) the only lower row rule (a symbol that is adjacent to a related symbol in a previous reel must be in an active symbol position that is in a lower row); (3) the only higher row rule (a symbol that is adjacent to a related symbol in a previous reel must be in an active symbol position that is in a higher row); (4) the different row rule (related symbols in adjacent reels must appear in active symbol positions that are in different rows); (5) the one-row-removed rule (related symbols in adjacent reels must be at least one row apart); (6) the spiral rule (a related symbol must be in an active symbol position which is in the same row or a higher row than the previous related symbol to form a string of related symbols, wherein once a related symbol in the top symbol position of one of the reels is added to the string, a related symbol in the bottom symbol position of the next adjacent reel can be added to the string); and (7) the bounce rule (a related symbol must be in an active symbol position which is in the same row or a lower row than the previous related symbol to form a string of related symbols, wherein once a related symbol in the bottom symbol position of one of the reels is added to the string, a related symbol in the top symbol position of the next adjacent reel can be added to the string).

After determining whether the first symbol in the active symbol position associated with the first reel 72 forms a string of related symbols with any symbols displayed in the active symbol positions associated with the second reel 74, the gaming device repeats the process described above for any remaining symbols displayed in active symbol positions associated with the first reel 72.

For each classified string of related symbols, the gaming device determines whether any of the symbols displayed in an active symbol position associated with the next adjacent reel 76 are related to that string of related symbols. If none of the symbols in an active symbol position associated with the next adjacent reel 76 are related to a formed string of related symbols, the gaming device marks or flags such string of related symbols as complete. If a symbol in an active symbol position associated with the next adjacent reel 76 is related to the symbols in the formed string of related symbols, the gaming device determines if that related symbol in the active symbol position associated with the adjacent reel 76 can be added to the string of related symbols according to the designated rule or rules employed in the game. If the symbol displayed in the active symbol position associated with the adjacent reel 76 is related to the symbols in the string of related symbols and can be added to the string of related symbols according to the designated rule or rules employed in the game, the gaming device adds this related symbol to the string of related symbols. If the related symbol in the active symbol position associated with the adjacent reel 76 cannot be added to the string of related symbols because doing so would violate the designated rule or rules employed in the game, the gaming device marks that string of related symbols as complete.

This process is repeated until either each of the strings of related symbols is complete, or until there are no more reels adjacent to the last reel which includes one of the related symbols.

When each string of related symbols is complete, the gaming device compares the symbol combinations in each of the formed strings of related symbols to an appropriate paytable. The gaming device determines any outcomes, such as any awards, associated with any winning symbol combinations and provides any determined outcomes to the player.

It should be appreciated that since the gaming device does not analyze each of the symbols generated on each of a plurality of paylines, but rather analyzes each of the symbols displayed in active symbol positions associated with a first reel and a second reel, and then analyzes only the related symbols which may be added to any active or incomplete string of related symbols according to the designated rules employed in the game, the processor of such a gaming device performs fewer evaluations. Thus, the entire award determination sequence occurs quicker than in a gaming device which analyzes each wagered on payline and is also quicker than a gaming device which analyzes symbols based on a scatter pay configuration.

Figure 3B:
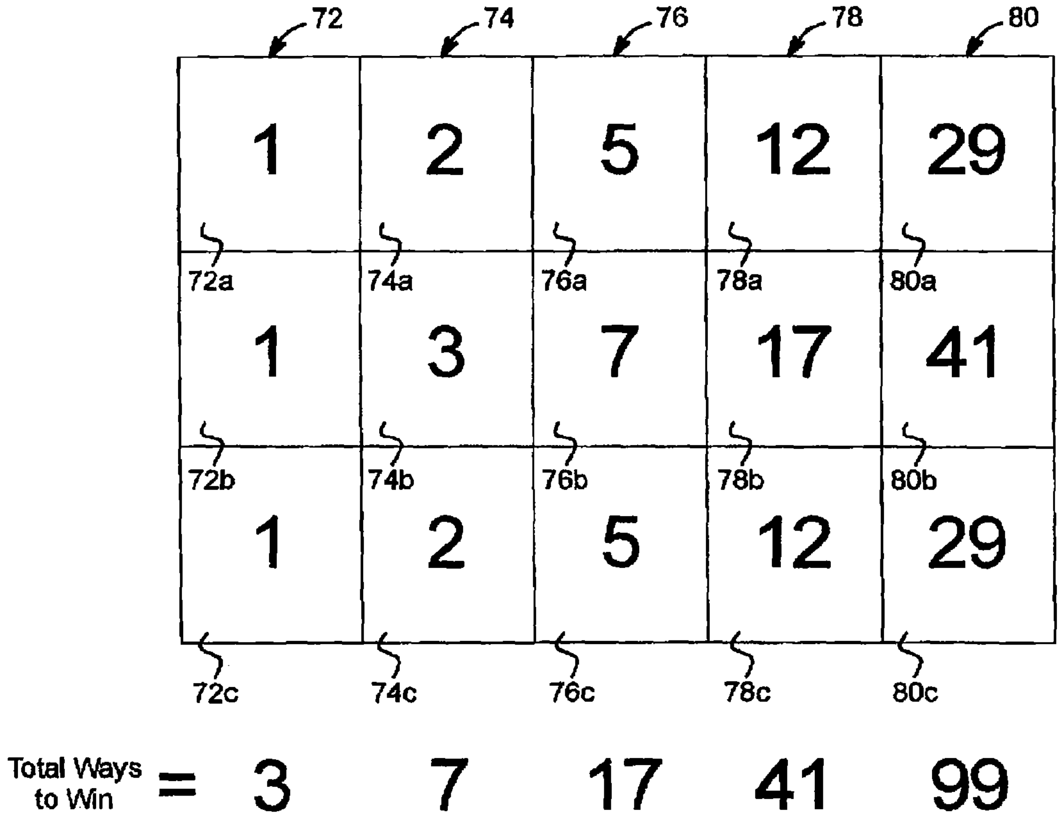
FIG. 3B is an enlarged front plan view of a reel configuration including five reels having three symbol positions associated with each reel which illustrates the number of ways to win in a game where the gaming device determines the ways to win according to the same/adjacent row rule.

Referring now to FIG. 3B, in one example embodiment, the gaming device employs the same/adjacent row rule in a game which includes five reels 72, 74, 76, 78, and 80, each of the reels associated with three symbol positions. According to the same/adjacent row rule, related symbols on adjacent reels must be displayed in active symbol positions that are in the same row or in adjacent rows to form a sting of related symbols.

As illustrated in FIG. 3B, each symbol position shows a number. This number represents the number of symbol positions that are previously adjacent to that symbol position. For example, symbol position 74*a* shows the number 2, indicating that there are two symbol positions associated with the previous reel 72 that are adjacent to symbol position 74*a* (i.e., symbol positions 72*a* and 72*b*). Symbol position 76*a* shows the number 5 indicating that symbol position 76*a* is adjacent to symbol positions 74*a* and 74*b*, which are in turn adjacent to two symbol positions of reel 72, and three symbol positions of reel 72, respectively, (2+3=5).

As discussed above, in known ways to win gaming devices having five reels with three active symbol positions on each reel, there are 243 ways to win (i.e., 3 symbols on the first reel×3 symbols on the second reel×3 symbols on the third reel×3 symbols on the fourth reel×3 symbols on the fifth reel). In the example of FIG. 3B, however, the number of ways to win in the game is reduced to 99 ways to win because the same/adjacent row rule requires that symbol positions on adjacent reels be in the same row or in adjacent rows to form a way to win.

In the example of FIG. 3B, if the gaming device activates each of the symbol positions associated with reels 72 and 74 for the game, symbol positions 72*a* and 74*c* cannot form a way to win under the same/adjacent row rule because these symbol positions are not in the same row or in adjacent rows. Similarly, symbol positions 72*c* and 74*a* cannot form a way to win under the same/adjacent row rule. On the other hand, in a gaming device that does not employ any rules restricting the possible number of ways to win, there would be 9 ways to win if each of the symbol positions on the first two reels in a five reel game were active symbol positions (i.e., 3 symbols on the first reel×3 symbols on the second reel). In this example, there are two less ways to win in a game employing the same/adjacent row rule when each of the symbol positions associated with the first two reels are active symbol positions.

As illustrated in FIG. 3B, if the player wishes to wager on 3 of the 99 possible ways to win, the gaming device activates each of the symbol positions of the first reel 72 and one default symbol position on each of reels 74, 76, 78, and 80 (i.e., symbol positions 74*b*, 76*b*, 78*b*, and 80*b*) to provide three ways to win. If a player wishes to wager on 7 ways to win, the gaming device activates the symbol positions of reels 72 and 74 and one default symbol position on each of reels 76, 78, and 80 (i.e., symbol positions 76*b*, 78*b*, and 80*b*) to provide seven ways to win. If the player wishes to wager on all of the possible ways to win in a game employing the same/adjacent row rule, the gaming device activates each of the symbol positions associated with all five reels to provide 99 ways to win.

Accordingly, employing one or more designated rules in a game limits the number of ways to win, and as a result limits the number of potential winning symbol combinations which must be analyzed.

Referring now to FIGS. 4A, 4B, 4C, 4D, 4E, 4F, 4G, 4H, 4I, 4J, 4K, and 4L an example of one embodiment of the present disclosure is illustrated where the gaming device employs the same/adjacent row rule to determine the ways to win in a game. That is, the gaming device applies the same/adjacent row rule to determine whether any strings of related symbols are formed which are evaluated for winning symbol combinations.

In one embodiment, the gaming device enables the player to select the rule or rules which are employed in the game. In one such embodiment, the set of available rules is displayed or made displayable to the player, and the player selects which rule or rules to employ in the game.

Figure 4A:
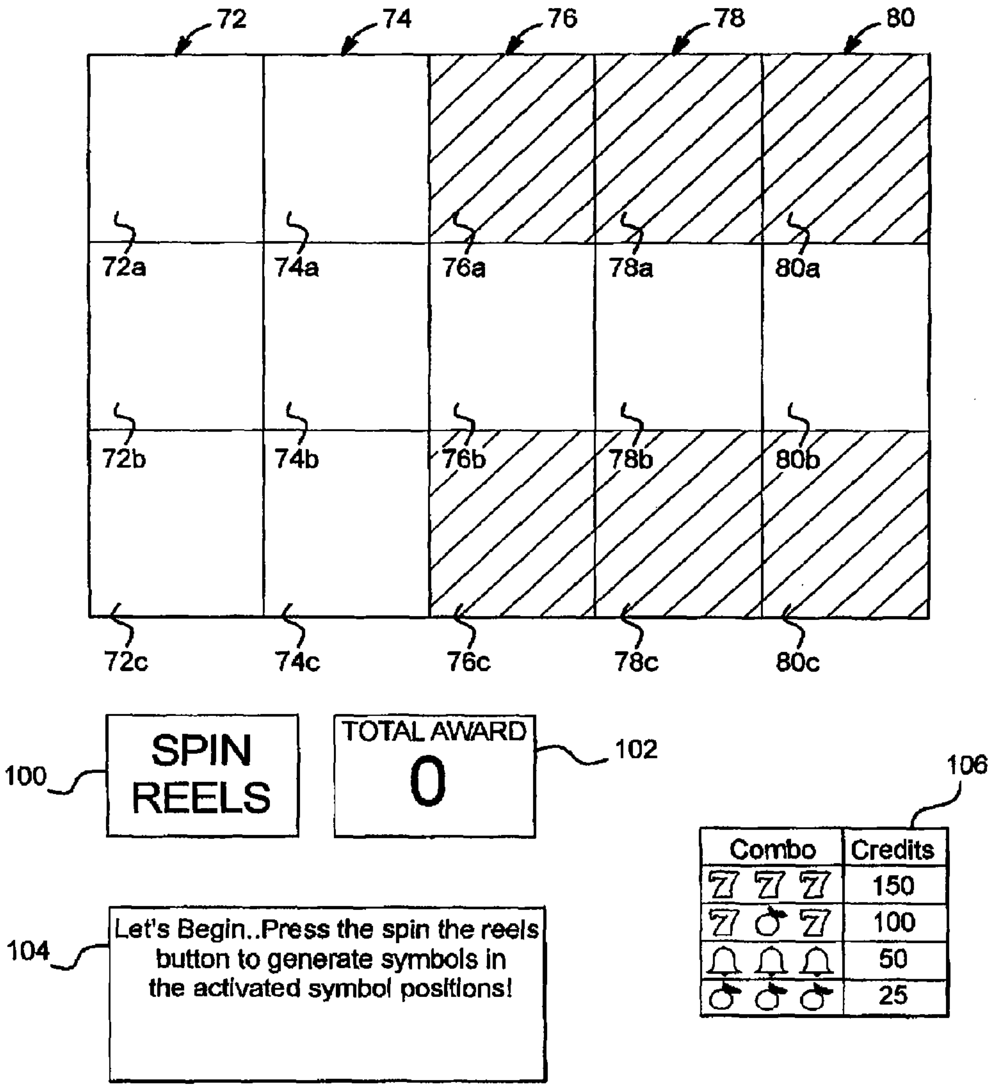
FIGS. 4A, 4B, 4C, 4D, 4E, 4F, 4G, 4H, 4I, 4J, 4K, and 4L are enlarged front plan views of one embodiment of the gaming device disclosed herein, illustrating a game wherein the gaming device determines the ways to win according to the same/adjacent row rule.

In FIG. 4A, the gaming device includes five reels 72, 74, 76, 78, and 80, each of the reels associated with three symbol positions. The gaming device further includes a “spin reels” button 100 and a total award display 102. The gaming device displays a paytable 106, showing the winning symbol combinations in the game and the associated award for each winning symbol combination.

As discussed above, there are 99 possible ways to win in the game. In this example, the player has wagered on seven ways to win. Appropriate messages such as “YOU WAGERED ON SEVEN WAYS TO WIN” may be provided to the player visually, or through suitable audio or audiovisual displays. Upon the player’s wager on seven ways to win, the gaming device activates a number of symbol positions corresponding to seven ways to win. As seen in FIG. 4A, the gaming device activates the three symbol positions on each of reels 72 and 74, and one default symbol position on each of reels 76, 78, and 80 (i.e., symbol positions 76*b*, 78*b*, and 80*b*).

In this example, the active symbol positions are blank, and non-active symbol positions are shaded. No symbols will be generated and displayed in non-active symbol positions. In other embodiments, symbols are generated and displayed in non-active symbol positions, but these symbols are suitably marked or shaded to indicate to a player that such symbol positions are not active.

The gaming device displays a message in message box 104 prompting the player to press the “spin reels” button 100 to generate symbols in the active symbol positions. The total award display 102 shows a zero, indicating that the player has not yet received an award in the game.

Figure 4B:
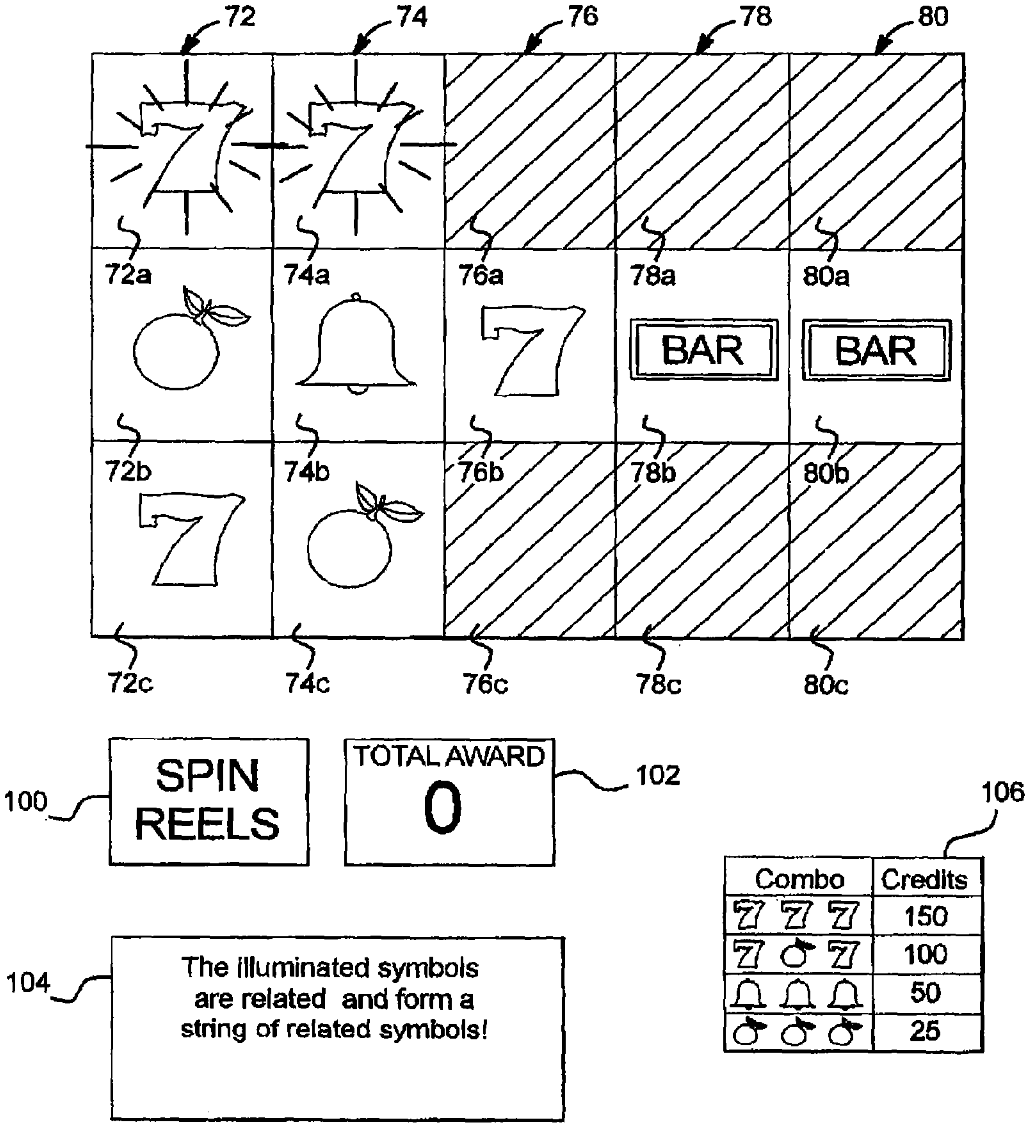

As illustrated in FIG. 4B, the player presses the “spin reels” button 100, and the gaming device generates and displays a symbol in each of the active symbol positions. After generating and displaying a symbol in each of the active symbol positions, the gaming device determines whether any of the symbols on the first reel are related to any of the symbols on the second reel. For illustration purposes, each possible string of related symbols is individually analyzed in this example. Accordingly, as seen in FIG. 4B, symbol positions 72*a* and 74*a* are illuminated to indicate to the player that the symbols displayed in these symbol positions will be evaluated to determine whether they are related symbols.

In this case, the gaming device determines that the seven symbol displayed in symbol position 72*a* and the seven symbol displayed in symbol position 74*a* are related because the two seven symbols form part of a winning symbol combination according to the paytable 106. Thus, the gaming device classifies the seven symbols displayed in symbol positions 72*a* and 74*a* as related symbols.

After determining that the symbols are related, the gaming device determines whether the related symbols form a string of related symbols. The gaming device, in this example, employs the same/adjacent row rule, which requires that symbols must be displayed in symbol positions that are in the same row or in adjacent rows to form a string of related symbols. Symbol positions 72*a* and 74*a* are in the same row.

Thus, the related seven symbols displayed in symbol positions 72*a* and 74*a* form a string of related symbols according to the same/adjacent row rule.

Figure 4C:
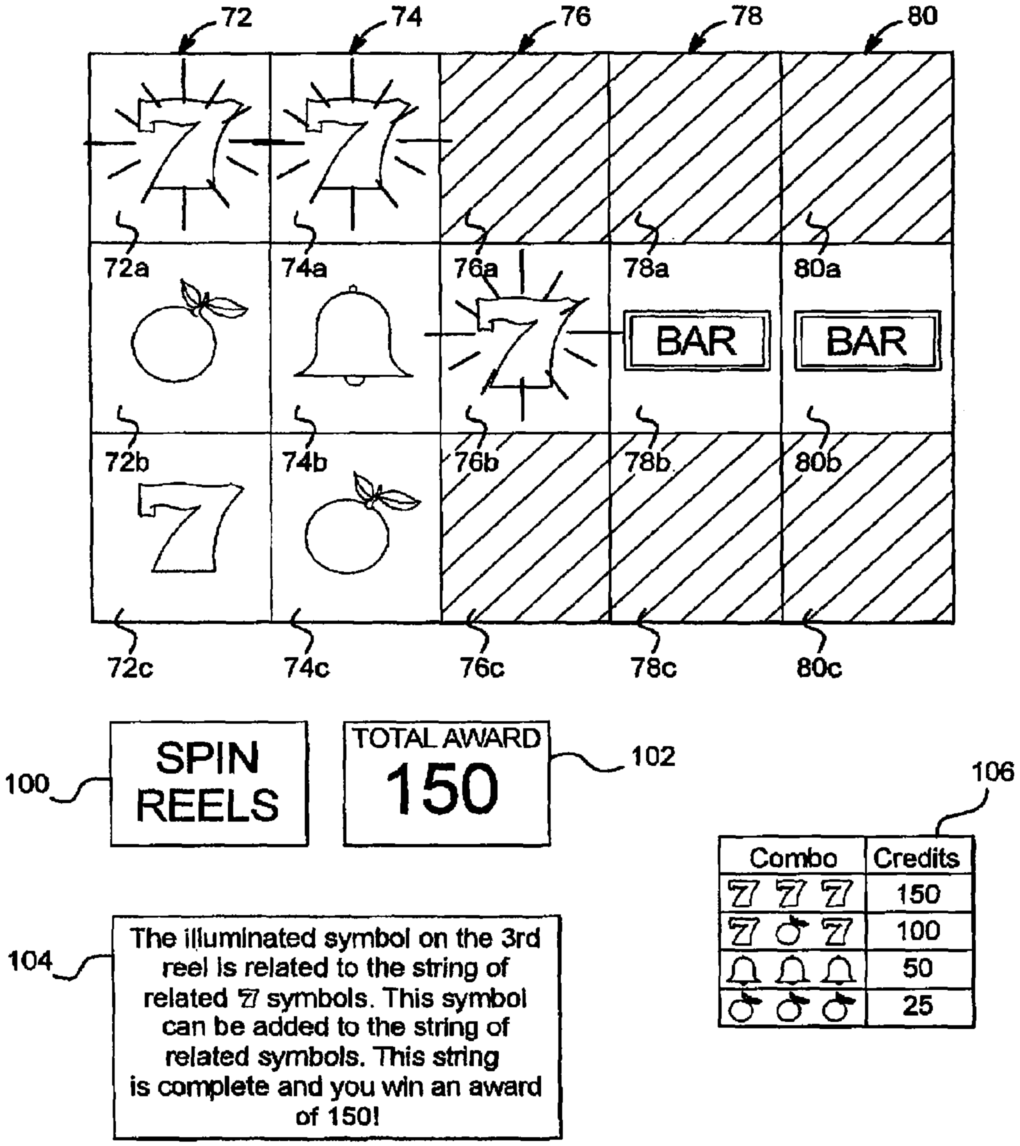

After classifying the string of related seven symbols displayed in symbol positions 72*a* and 74*a*, the gaming device determines whether any symbols on the next adjacent reel 76 need to be added to the string of related seven symbols. Accordingly, as seen in FIG. 4C, symbol positions 72*a*, 74*a*, and 76*b* are illuminated to indicate to the player that the gaming device is evaluating these symbol positions to determine whether the symbol displayed in symbol position 76*b* should be added to the string of related symbols. The seven symbol displayed in symbol position 76*b* is related to the two seven symbols in the string of related symbols. Symbol position 76*b* is in a row that is adjacent to the row which includes symbol position 74*a*, and thus the same/adjacent row rule is satisfied. Therefore, the gaming device adds the seven symbol displayed in symbol position 76*b* to the string of related symbols.

The gaming device determines whether any symbols on the next adjacent reel 78 need to be added to the string of related seven symbols. next adjacent reel 78 includes no symbols that are related to the string of related seven symbols. Thus, the gaming device marks the string of related seven symbols in symbol positions 72*a*, 74*a*, and 76*b* as complete. The gaming device compares the combination of three seven symbols to the paytable 106. According to paytable 106, the completed string of three seven symbols corresponds to a winning symbol combination associated with an award of 150 credits. The gaming device provides the award of 150 credits to the player, as indicated in the total award display 102. Appropriate messages such as "YOU WIN AN AWARD OF ONE HUNDRED AND FIFTY CREDITS!" may be provided to the player visually, or through suitable audio or audiovisual displays.

Figure 4D:
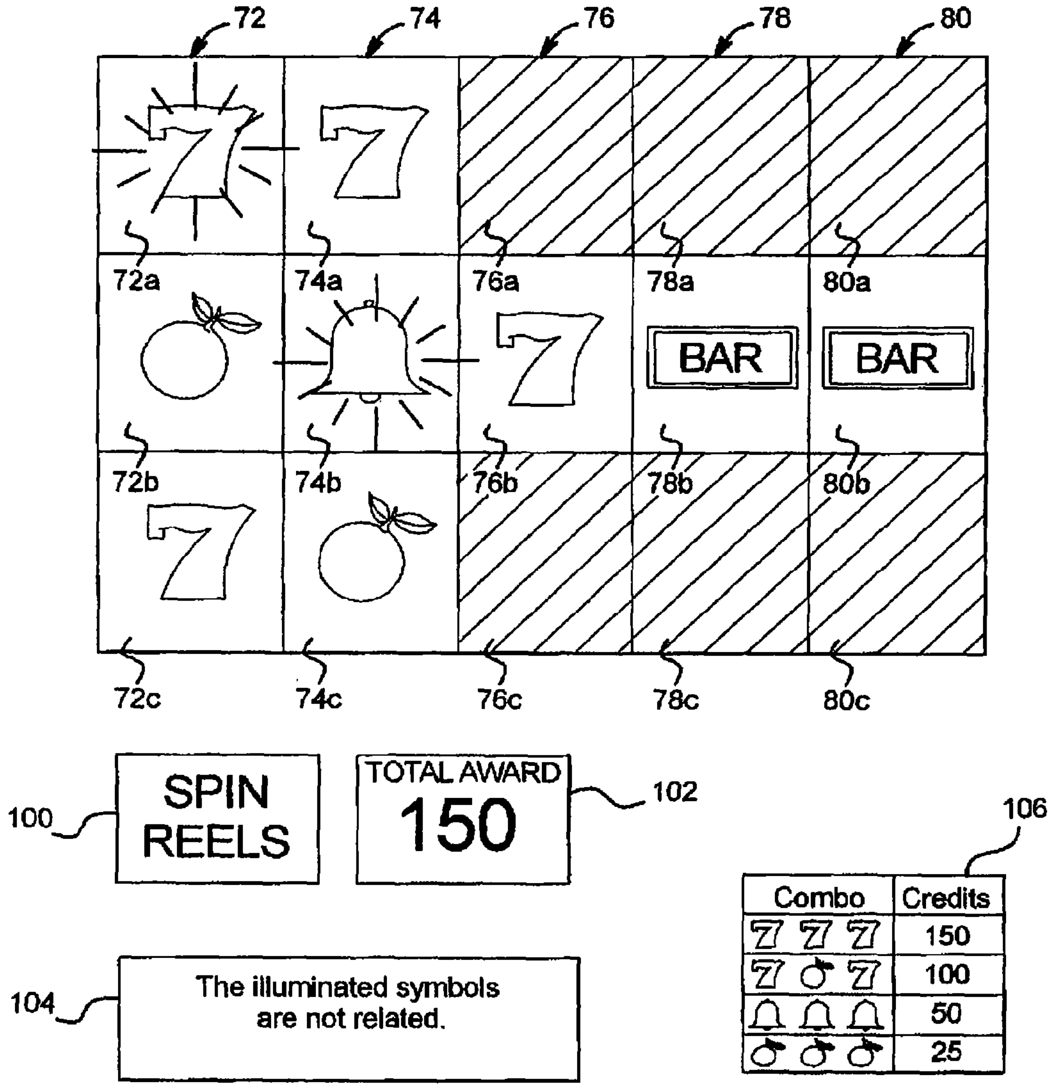

As seen in FIG. 4D, symbol positions 72*a* and 74*b* are illuminated to indicate to the player that the symbols displayed in these symbol positions will be evaluated to determine whether they are related symbols. The bell symbol displayed in symbol position 74*b* is not related to the seven symbol displayed in symbol position 72*a* (i.e., the seven symbol and bell symbol do not form all or part of a winning symbol combination).

Since the gaming device determined that the bell symbol displayed in symbol position 74*b* is not related to the seven symbol displayed in symbol position 72*a*, the gaming device does not analyze the symbols to determine whether they form a string of related symbols. In other words, if it is determined that symbols are not related, the analysis ends prior to the gaming device evaluating whether the symbols can form a string under the applicable rule in the game. In this case, no string of related symbols is formed. Appropriate messages such as "YOU WIN NO AWARD" may be provided to the player visually, or through suitable audio or audiovisual displays. As indicated by the total award display 102, the player's total award in the game is still 150 credits.

Figure 4E:
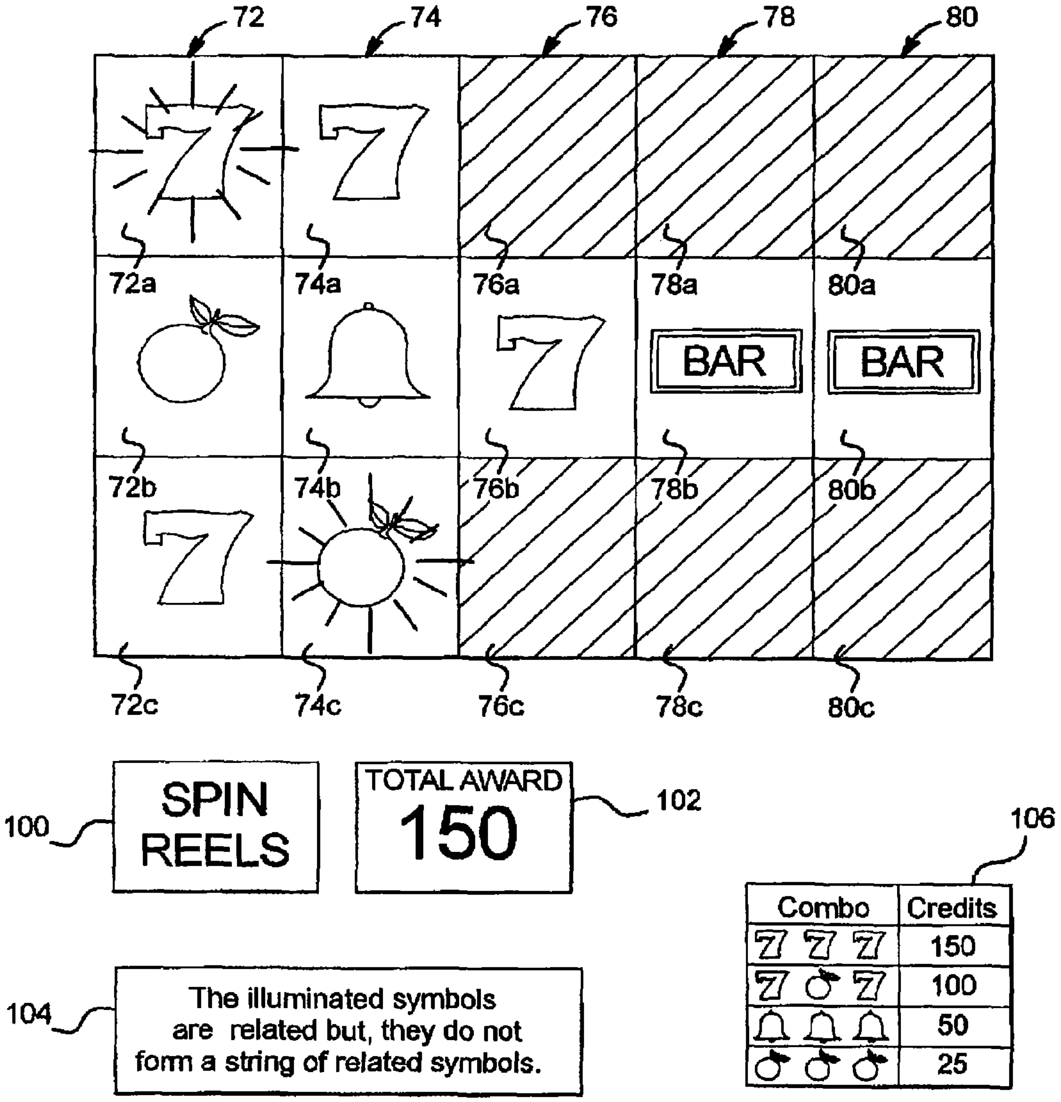

As seen in FIG. 4E, symbol positions 72*a* and 74*c* are illuminated to indicate to the player that the symbols displayed in these symbol positions will be evaluated to determine whether they are related symbols. The gaming device determines that the seven symbol displayed in symbol position 72*a* and the orange symbol displayed in symbol position 74*c* are related because the seven symbol and the orange symbol form part of a winning symbol combination according to the paytable 106. Thus, the gaming device classifies the seven symbol displayed in symbol position 72*a* and the orange symbol displayed in symbol position 74*c* as related symbols.

However, the symbols displayed in symbol positions 72*a* and 74*c* do not form a string of related symbols according to the same/adjacent row rule. As discussed above, under the same/adjacent row rule, symbols must be displayed in symbol positions that are in the same row or in adjacent rows to form a string of related symbols. Symbol positions 72*a* and 74*c* are not in the same row or adjacent rows. Therefore, no string of related symbols is formed. Appropriate messages such as "YOU WIN NO AWARD" may be provided to the player visually, or through suitable audio or audiovisual displays. As indicated by the total award display 102, the player's total award in the game is still 150 credits.

Figure 4F:
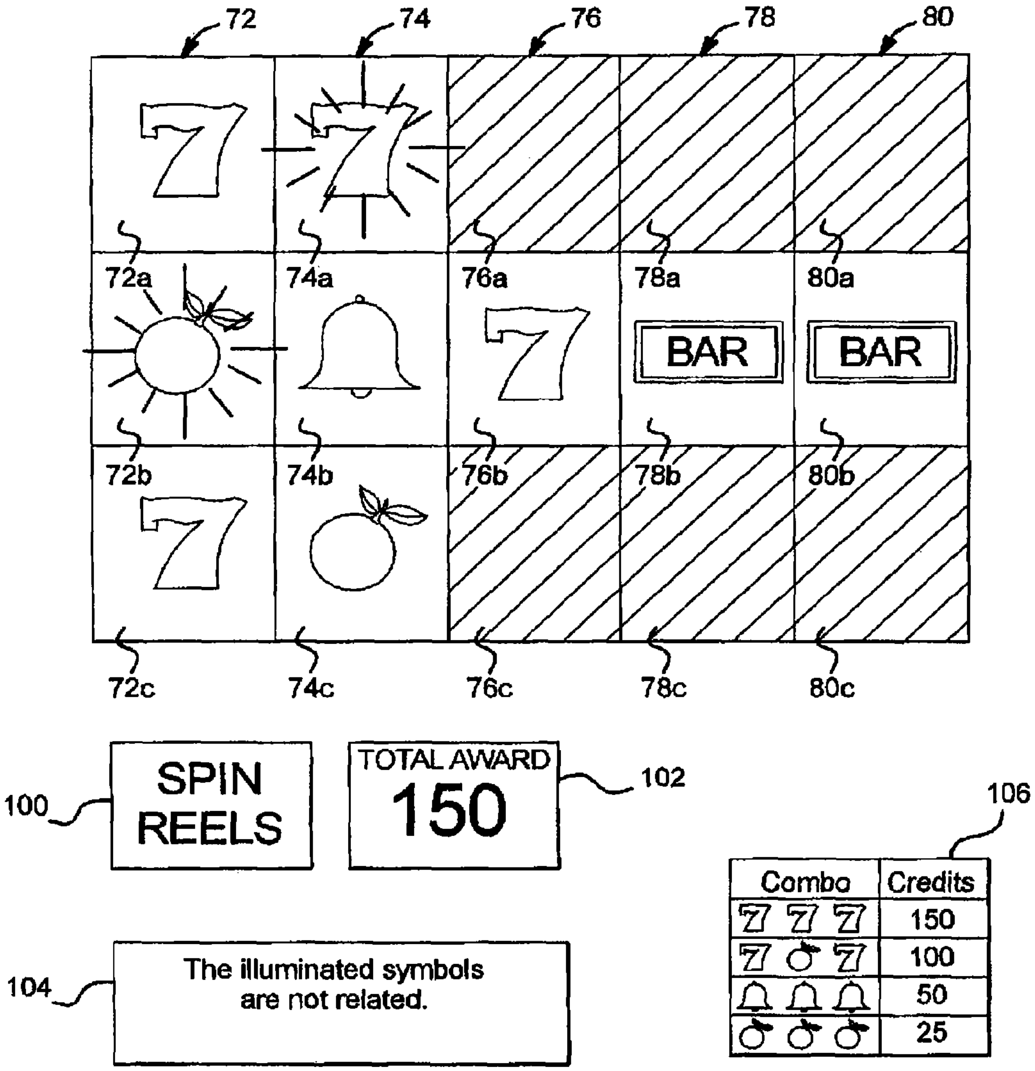

As seen in FIG. 4F, the gaming device illuminates symbol positions 72*b* and 74*a* indicating that the symbols displayed in these symbol positions will be evaluated to determine whether they are related symbols. The gaming device determines that the orange symbol displayed in symbol position 72*b* and the seven symbol displayed in symbol position 74*a* are not related because they do not form part of a winning symbol combination according to the paytable 106.

Figure 4G:
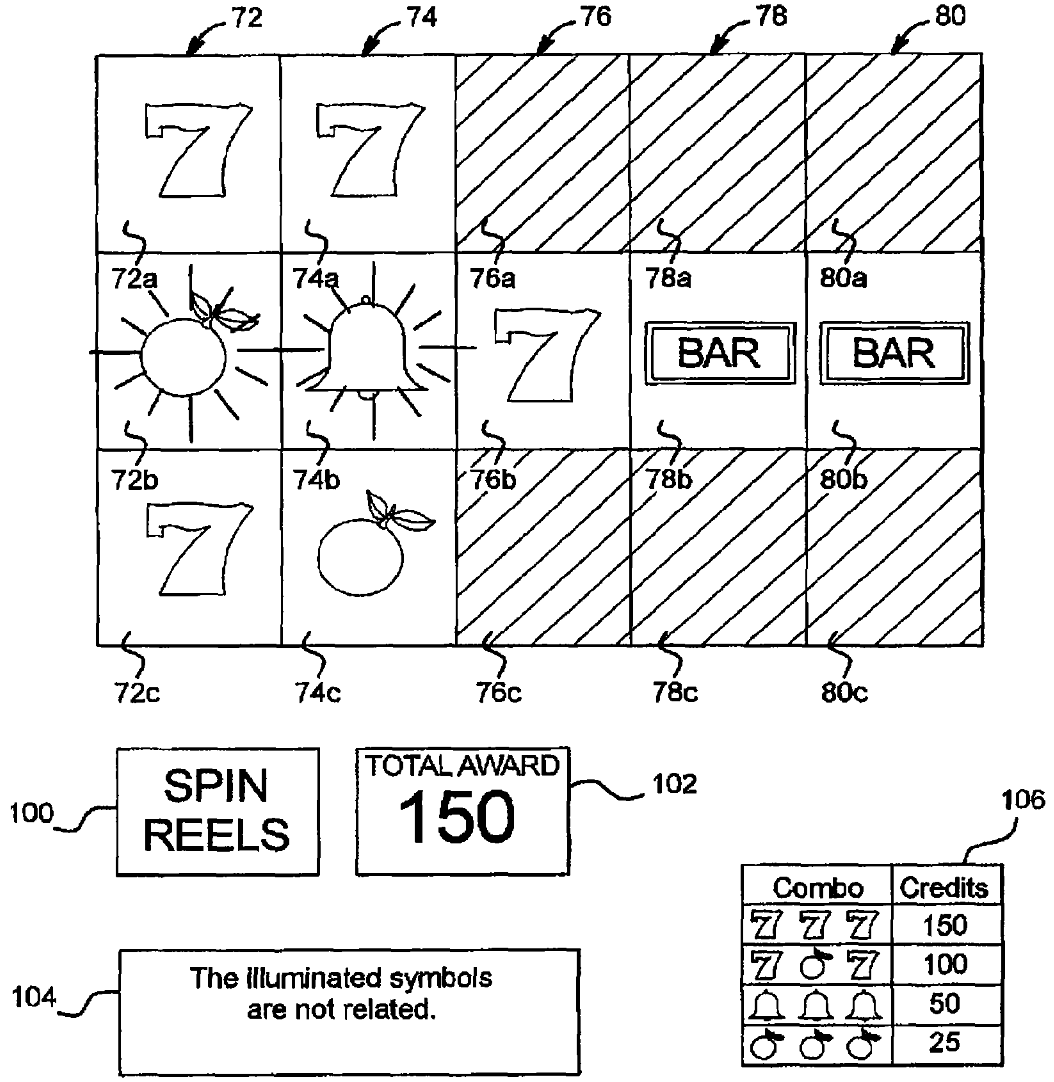

As seen in FIG. 4G, the gaming device illuminates symbol positions 72*b* and 74*b* indicating that the symbols displayed in these symbol positions will be evaluated to determine whether they are related symbols. The gaming device determines that the orange symbol displayed in symbol position 72*b* and the bell symbol displayed in symbol position 74*b* are not related because they do not form part of a winning symbol combination according to the paytable 106.

Figure 4H:
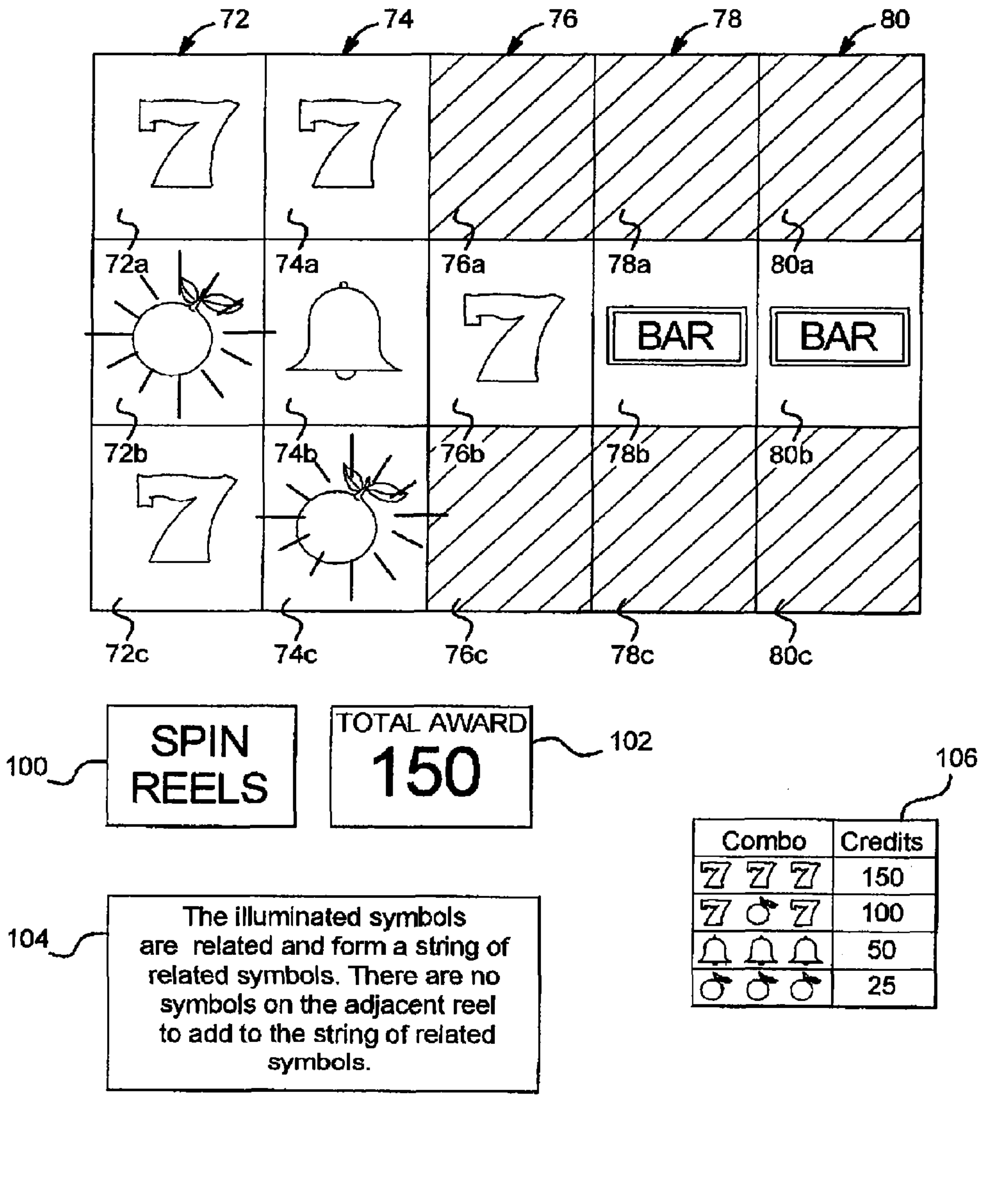

As seen in FIG. 4H, the gaming device illuminates symbol positions 72*b* and 74*c* indicating that the symbols displayed in these symbol positions will be evaluated to determine whether they are related symbols. The gaming device determines that the orange symbol displayed in symbol position 72*b* and the orange symbol displayed in symbol position 74*c* are related because they form part of a winning symbol combination according to the paytable 106.

The gaming device determines whether any symbols on the next adjacent reel 78 need to be added to the string of related orange symbols. Next adjacent reel 78 includes no symbols that are related to the string of related orange symbols. Thus, the gaming device marks the string of related orange symbols in symbol positions 72*b* and 74*c* as complete. The gaming device compares the combination of two orange symbols to the paytable 106. According to paytable 106, the completed string of two orange symbols does not correspond to a winning symbol combination. Appropriate messages such as "YOU WIN NO AWARD" may be provided to the player visually, or through suitable audio or audiovisual displays. As indicated by the total award display 102, the player's total award in the game is still 150 credits.

Figure 4I:
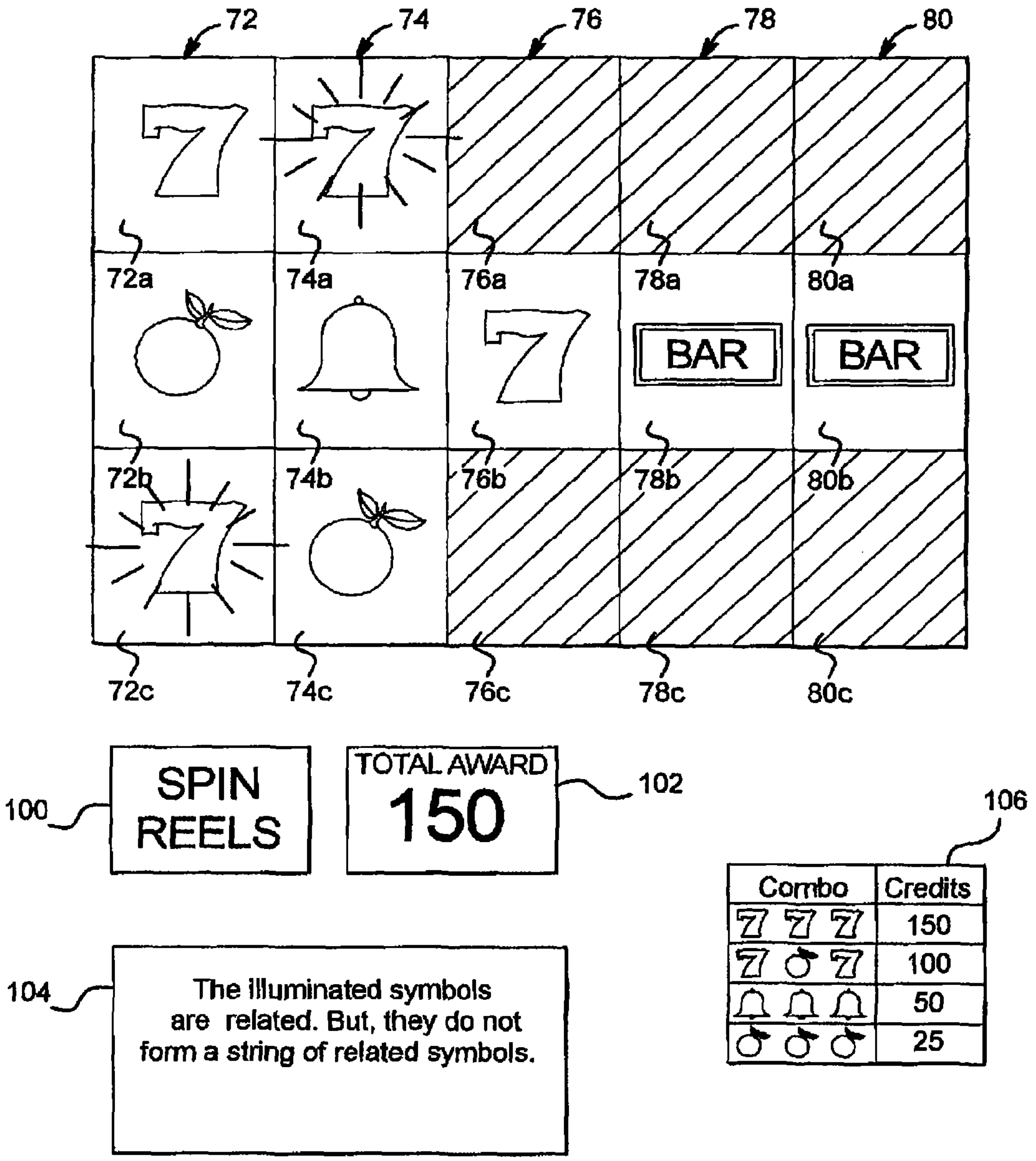

As seen in FIG. 4I, the gaming device illuminates symbol positions 72*c* and 74*a* indicating that the symbols displayed in these symbol positions will be evaluated to determine whether they are related symbols. The gaming device determines that the seven symbol displayed in symbol position 72*c* and the seven symbol displayed in symbol position 74*a* are related because they form part of a winning symbol combination according to the paytable 106. Thus, the gaming device classifies the seven symbols displayed at symbol positions 72*c* and 74*a* as related symbols.

After determining that the symbols are related, the gaming device determines whether the related symbols form a string of related symbols. Symbol positions 72*c* and 74*a* are not in the same row or in adjacent rows. Thus, no string of related symbols is formed. Appropriate messages such as "YOU WIN NO AWARD" may be provided to the player visually, or through suitable audio or audiovisual displays. The total award display 102 indicated the player's total award in the game is 150 credits.

Figure 4J:
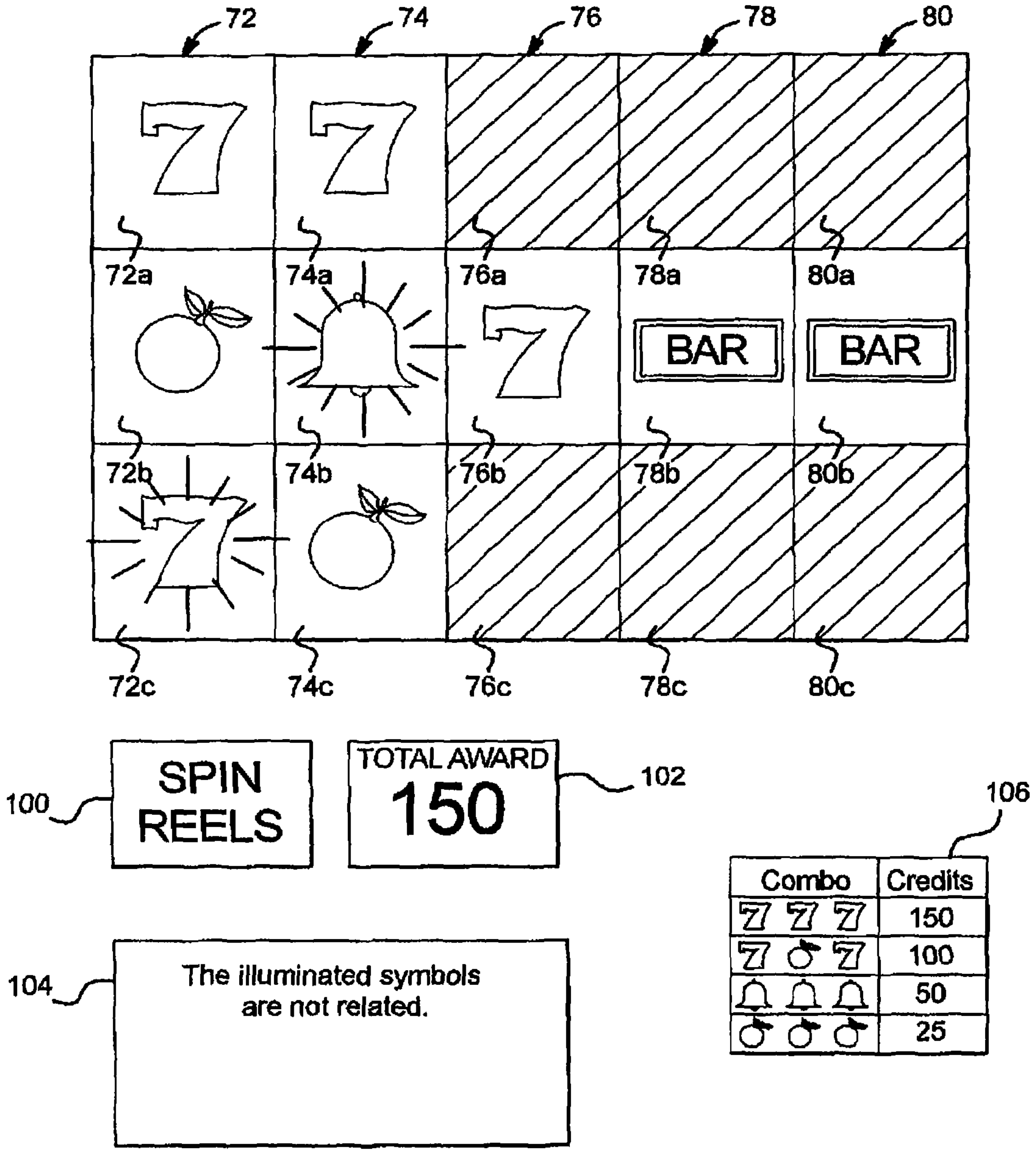

As seen in FIG. 4J, symbol positions 72*c* and 74*b* are illuminated to indicate to the player that the symbols displayed in these symbol positions will be evaluated to determine whether are related symbols. The bell symbol generated in symbol position 74*b* is not related to the seven symbol generated in symbol position 72*c* (i.e., the seven symbol and bell symbol do not form all or part of a winning symbol combination according to paytable 106). Thus, the analysis ends prior to the gaming device evaluating whether the symbols can from a string under the same/adjacent row rule. Appropriate messages such as "YOU WIN NO AWARD" may be provided to the player visually, or through suitable audio or audiovisual displays. As indicated by the total award display 102, the player's total award in the game is still 150 credits.

Figure 4K:
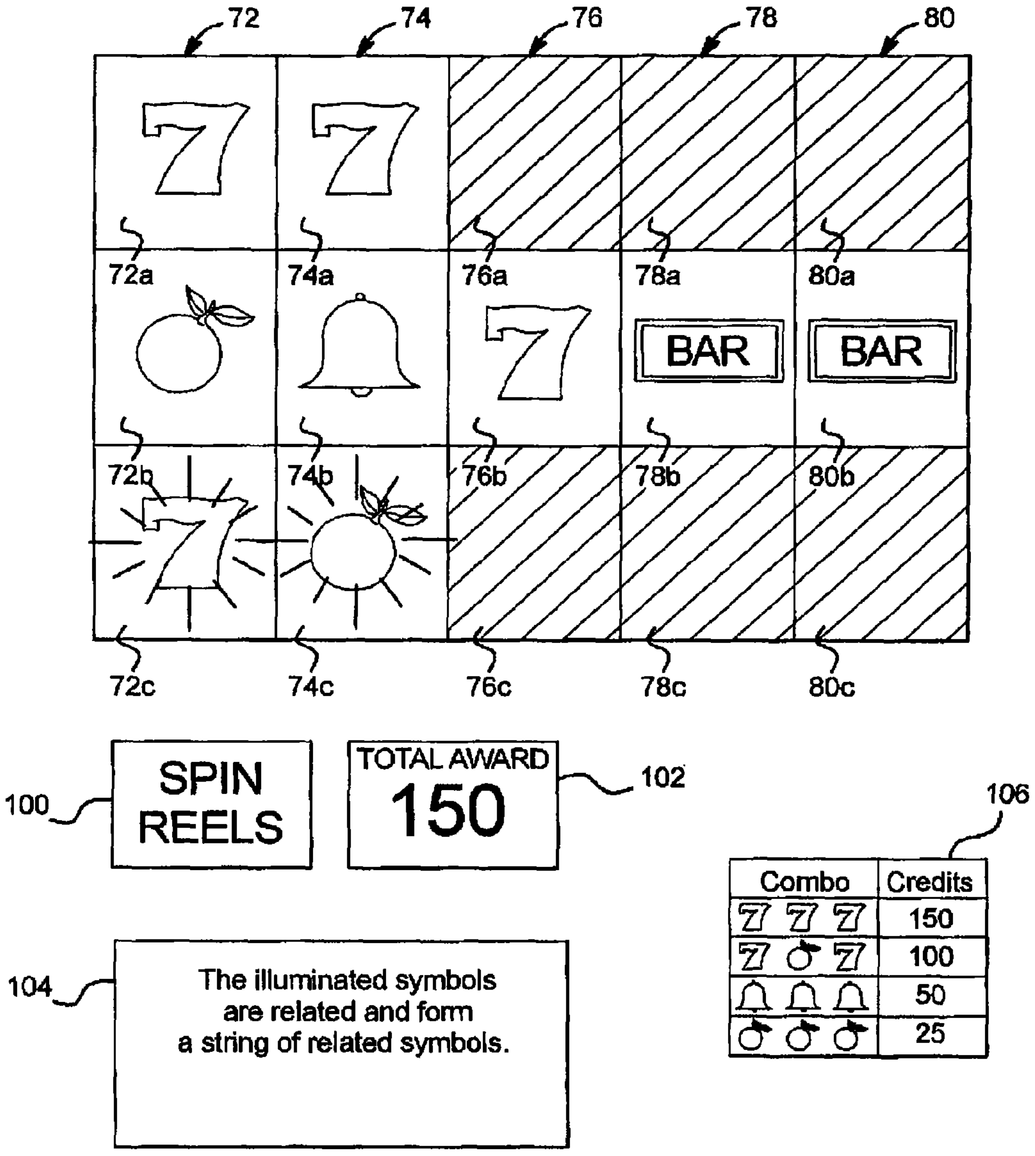

As seen in FIG. 4K, symbol positions 72*c* and 74*c* are illuminated to indicate to the player that the symbols displayed in these symbol positions will be evaluated to determine whether they are related symbols. The gaming device determines that the seven symbol displayed in symbol position 72*c* and the orange symbol displayed in symbol position 74*c* are related because the seven and orange symbols form part of a winning symbol combination according to the paytable 106*b*. Thus, the gaming device classifies the seven and orange symbols displayed in symbol positions 72*c* and 74*c*, respectively, as related symbols. In addition, symbol positions 72*c* and 74*c* are in the same row, and the related symbols displayed in symbol positions 72*c* and 74*c* form a string of related symbols under the same/adjacent row rule.

After classifying the seven and orange symbols displayed in symbol positions 72*c* and 74*c* as a string of related symbols, the gaming device determines whether any symbols on the next adjacent reel 76 need to be added to this string of related symbols.

Figure 4L:
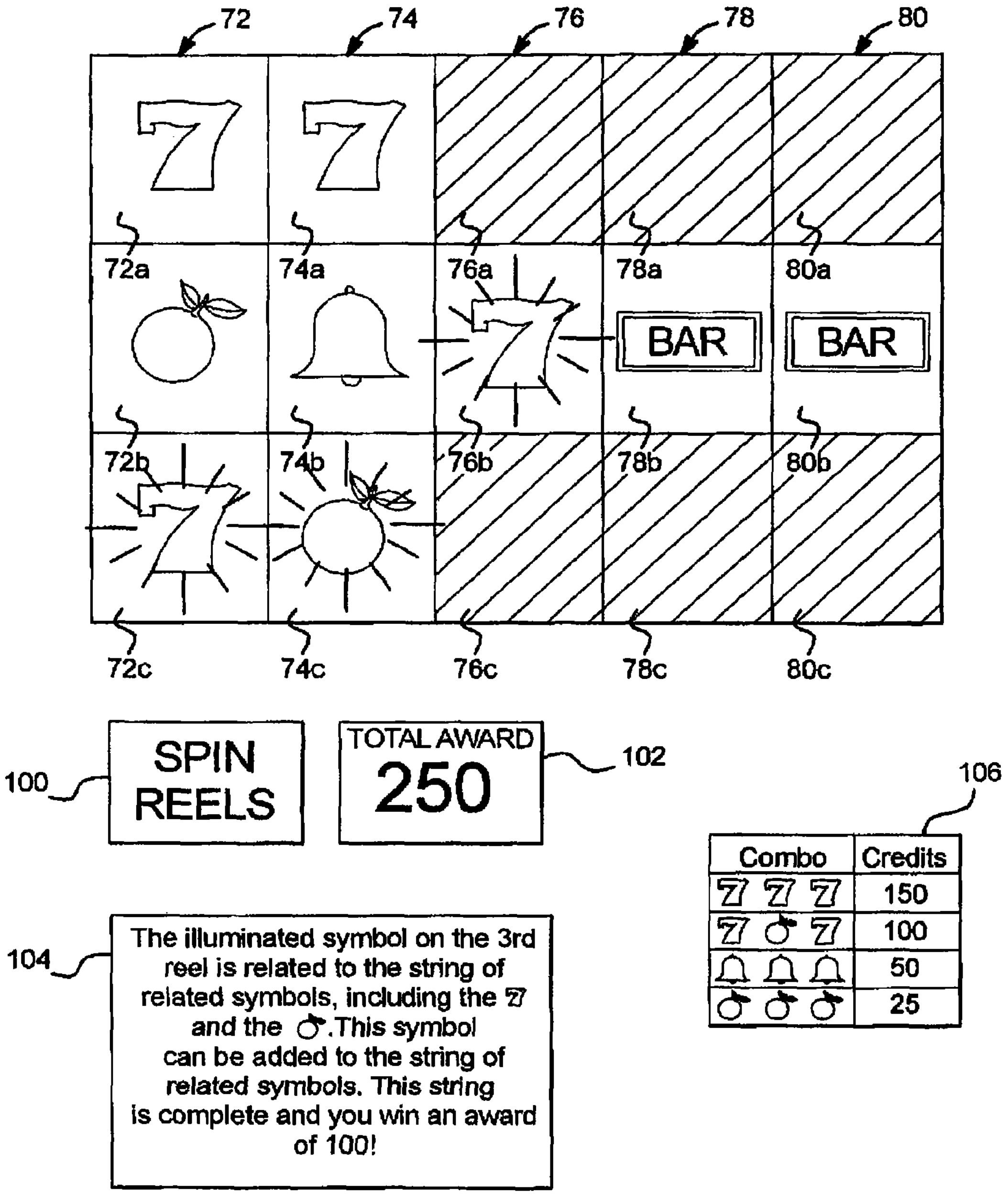

Accordingly, as seen in FIG. 4L, symbol positions 72*c*, 74*c*, and 76*b* are illuminated to indicate to the player that the gaming device will evaluate the symbols displayed in these symbol positions to determine whether the symbol displayed in symbol position 76*b* can be added to the string of related symbols. The seven symbol displayed in symbol position 76*b* is related to the seven symbol and orange symbol in the previously formed string of related symbols. Symbol position 76*b* is adjacent to the string of related symbols. Since the gaming device employs the same/adjacent row rule, the gaming device adds the seven symbol displayed in symbol position 76*b* to the string of related symbols.

After adding the seven symbol displayed in symbol position 76*b* to the string of related symbols, there are no other adjacent reels to evaluate. The gaming device marks the string of related symbols as complete. According to paytable 106, the completed string which includes a seven symbol, an orange symbol, and a seven symbol corresponds to a winning symbol combination associated with an award of 100 credits. The gaming device adds 100 credits to the player's previous award of 150 credits. Thus, the player has a total award of 250 credits, as indicated in the total award display 102. Appropriate messages such as "YOU WIN AN AWARD OF ONE HUNDRED CREDITS" may be provided to the player visually, or through suitable audio or audiovisual displays.

In one embodiment of the present disclosure, if the same set of symbols may be combined for two or more winning symbol combinations, the gaming device will provide the player an award for one of the winning symbol combinations and not each of the winning symbol combinations that the set of symbols may form. For example, if three displayed seven symbols form a winning symbol combination, the gaming device will provide the player an award for the three displayed seven symbols, but the gaming device will not provide the player an award for the symbol combinations of two displayed seven symbols, even though such a two seven symbol combination may otherwise be a winning symbol combination associated with an award.

Figure 5A:
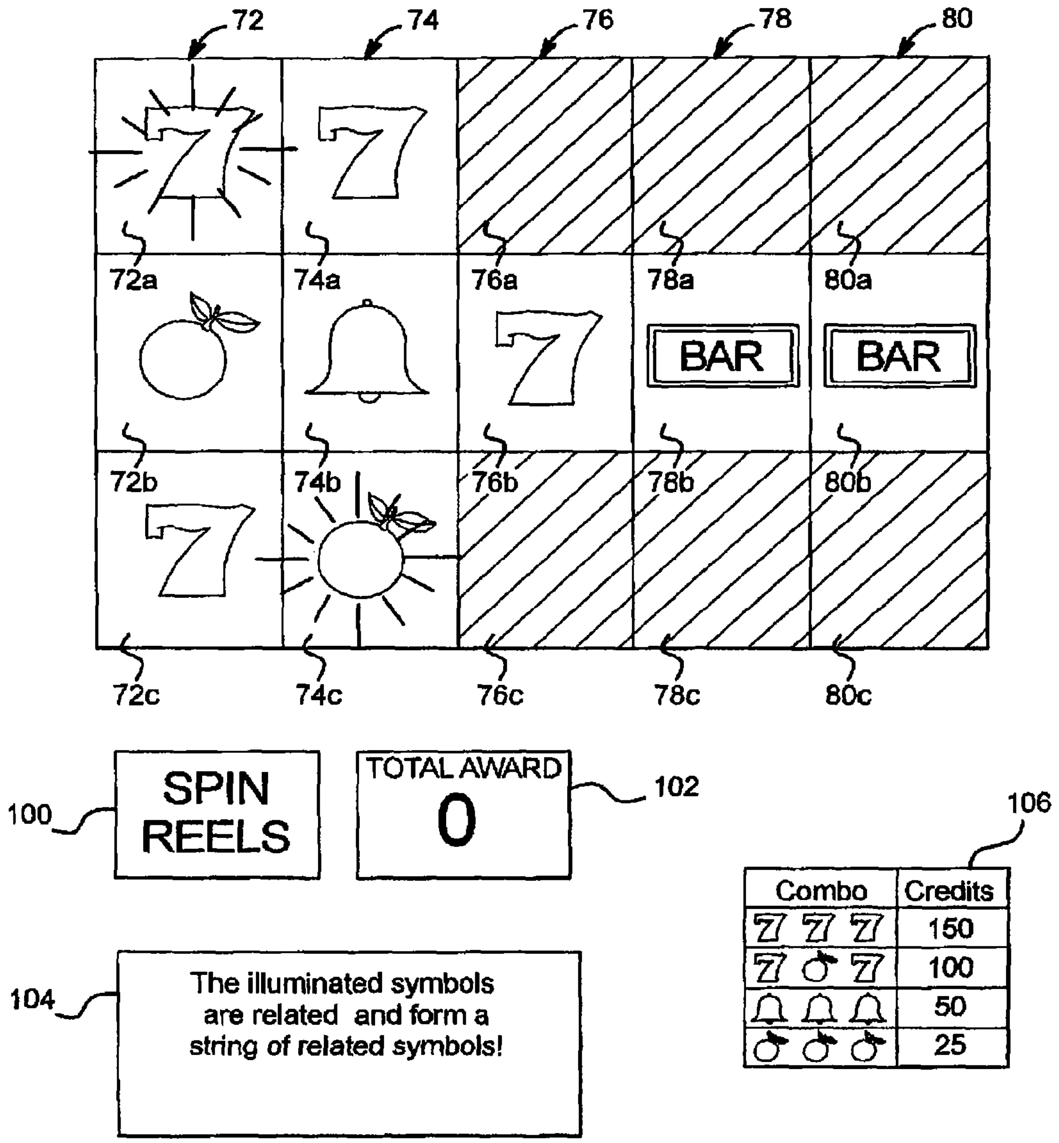
FIGS. 5A and 5B are enlarged front plan views of one embodiment of the gaming device disclosed herein, illustrating a game wherein the gaming device determines the ways to win according to the same/lower row rule.
Figure 5B:
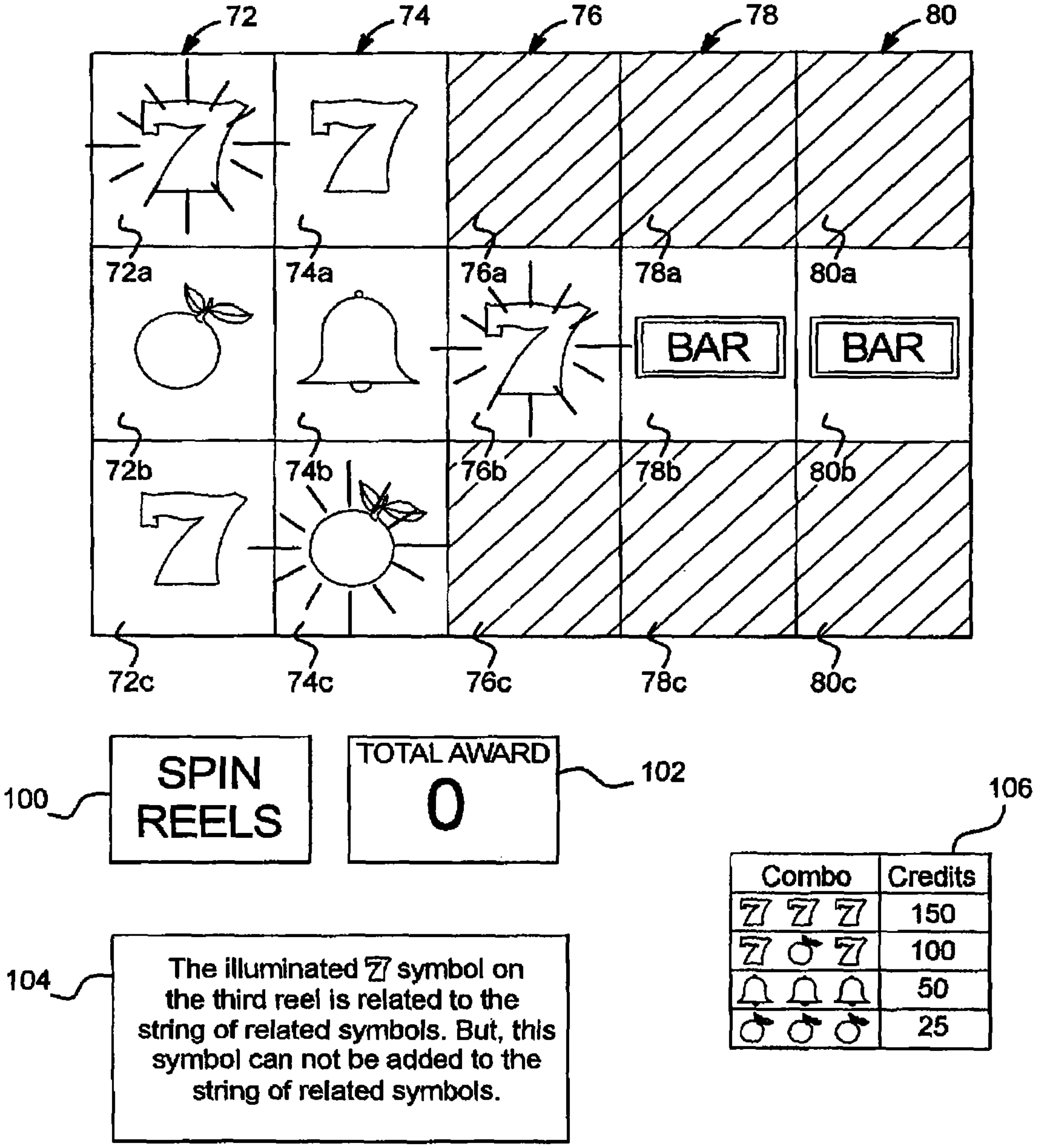

Referring now generally to FIGS. 5A and 5B, an example of one embodiment of the present disclosure is illustrated where the gaming device employs the same/lower row rule to determine the ways to win in the game. That is, the gaming device applies the same/lower row rule to determine whether any strings of related symbols are formed which are evaluated for winning symbol combinations.

As illustrated in FIG. 5A, the gaming device generates and displays a symbol in each of a plurality of activated symbol positions. The gaming device determines whether any of the symbols on the first reel are related to any of the symbols on the second reel. For ease of illustration, in this example, only one string of related symbols is analyzed applying the same/lower row rule. Accordingly, as seen in FIG. 5A, symbol positions 72*a* and 74*c* are illuminated to indicate to the player that the gaming device will evaluate these symbols to determine whether they are related.

In this case, the gaming device determines that the seven symbol displayed in symbol position 72*a* and the orange symbol displayed in symbol position 74*c* are related because the seven symbol and the orange symbol form part of a winning symbol combination according to the paytable 106. Thus, the gaming device classifies the seven symbol displayed in symbol position 72*a* and the orange symbol displayed in symbol position 74*c* as related symbols.

After determining that the symbols are related, the gaming device determines whether the related symbols form a string of related symbols according to the same/lower row rule. The same/lower row rule requires that a symbol related to another symbol in a previous adjacent reel must be in an active position which is in the same row or in a lower row to form a string of related symbols. Symbol position 74*c* is in a reel which is adjacent to symbol position 72*a*. Symbol position 74*c* is in a lower row than symbol position 72*a*. Thus, symbol positions 72*a* and 74*c* satisfy the same/lower row rule, and the related symbols displayed in symbol positions 72*a* and 74*c* form a string of related symbols.

After classifying the string of related symbols displayed in symbol positions 72*a* and 74*c*, the gaming device determines whether any symbols on the next adjacent reel 76 need to be added to the string of related symbols. Accordingly, as seen in FIG. 5B, symbol positions 72*a*, 74*c*, and 76*b* are illuminated to indicate to the player that the gaming device is evaluating these symbol positions to determine whether the symbol displayed in symbol position 76*b* should be added to the string of related symbols. The seven symbol displayed in symbol position 76*b* is related to the string of related symbols which includes the seven symbol of symbol position 72*a* and the orange symbol of symbol position 74*c*. Symbol position 76*b*, is in a reel that is adjacent to the reel; including symbol position 74*c* (the symbol position that displays the last symbol of the previously formed string of related symbols). However, symbol position 76*b* is in not in a row that is lower than the row including symbol position 74*c*. Therefore, the same/lower row rule is not satisfied. The gaming device cannot add the seven symbol displayed in symbol position 76*b* to the formed string of related symbols because this violates the same/lower row rule.

In an alternative embodiment, the gaming device employs one or more designated rules to determine a number of available paylines in a game. In one such embodiment, the gaming device includes a plurality of reels associated with a game, each reel including a plurality of symbols. A plurality of symbol positions are associated with the reels. In certain embodiments, the symbol positions are arranged in an array of rows and columns. In a play of the game, upon a suitable triggering event, such as a wager by a player, the gaming device activates the reels to generate and display a symbol in each of the symbol positions. The gaming device determines a number of available paylines in the game, according to one or more designated rules employed in the game.

In one embodiment, the player selects the rule or rules which are employed to determine the number of available paylines in the game. In one such embodiment, the set of available rules is displayed or made displayable to the player, and the player selects which rule to employ in the game.

In one embodiment where more than one designated rule applies, the rules may not be combined to form a payline in the game. For example, a payline can either satisfy the same/lower rule (i.e., each symbol position along that payline is in a same or lower row than the preceding symbol position), or it can satisfy the same/higher rule (i.e., each symbol position along that payline is in a same or higher row than the preceding symbol position).

Alternatively, in one embodiment, if the gaming device employs more than one designated rule to determine available paylines in the game, the rules may be combined to form a payline.

Figure 6:
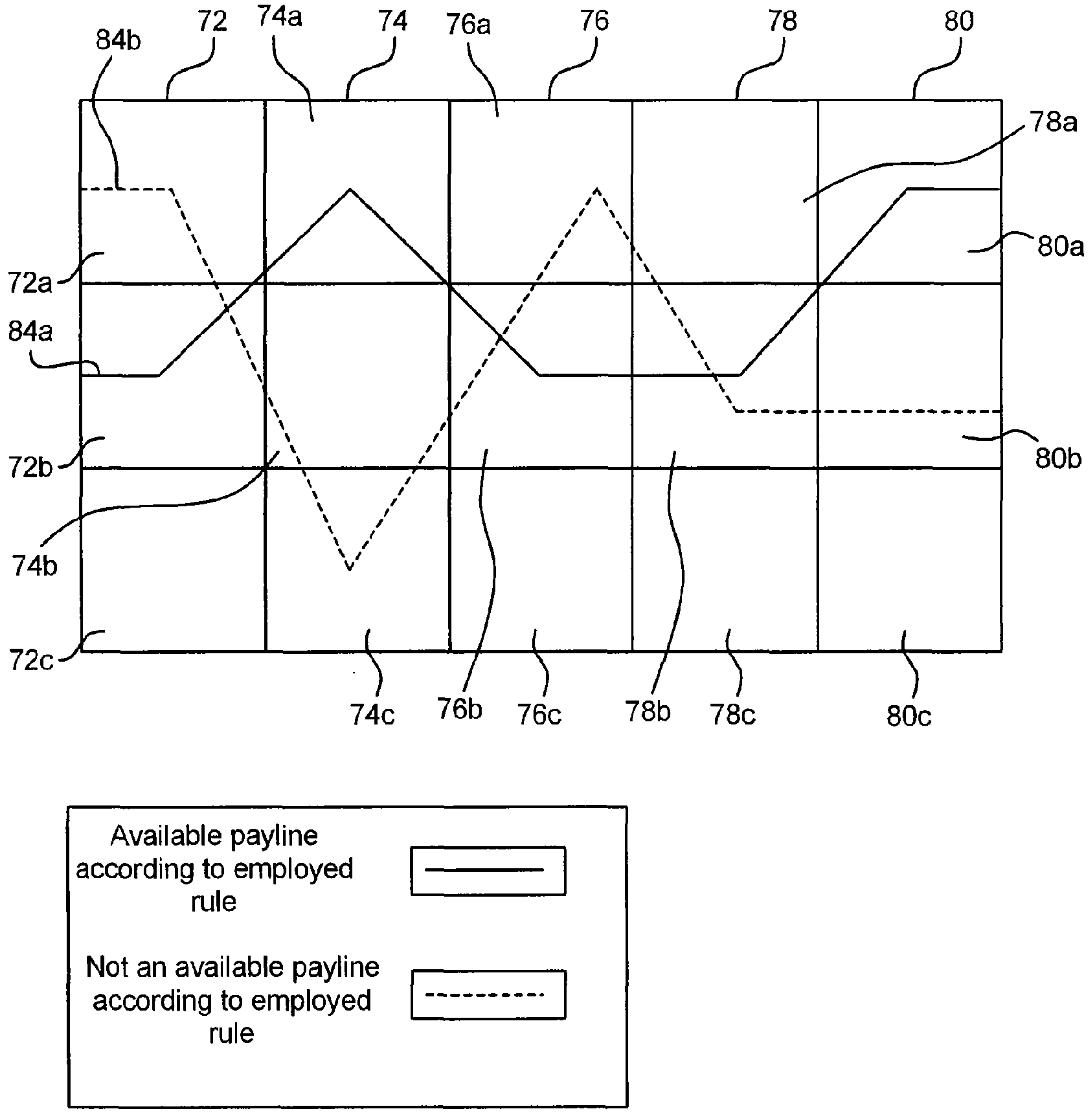
FIG. 6 is an enlarged front plan view showing one embodiment of the present disclosure, wherein the gaming device employs one possible designated rule for determining available paylines.

Referring now to FIG. 6, one embodiment of the gaming device of the present disclosure employs a designated rule to determine a number of available paylines in a game. In this embodiment, the gaming device includes five reels 72, 74, 76, 78, and 80, each of the reels associated with three symbol positions (e.g., symbol positions 72*a*, 72*b*, and 72*c* are associated with reel 72). The symbol positions are arranged in a plurality of rows and a plurality of columns. In one embodiment, according to the same/adjacent row payline rule, an available payline must include one symbol position from each of the columns, and symbol positions in adjacent columns must be in the same row or in adjacent rows.

Payline 84*a* is shown as a solid line because payline 84*a* is an available payline according to the same/adjacent row payline rule. That is, payline 84*a* includes one symbol position from each column, and the symbol positions that are in adjacent columns are in the same row or in adjacent rows (payline 84*a* includes symbol positions 72*b*, 74*a*, 76*b*, 78*b*, and 80*a*). On the other hand, payline 84*b* is shown as a phantom line because payline 84*b* is not an available payline according to the same/adjacent row payline rule. While payline 84*b* includes a symbol position from each of the columns, symbol position 72*a* is not in the same row or in an adjacent row as symbol position 74*c*. Thus, the gaming device does not evaluate the symbols generated along payline 84*b* for possible winning symbol combinations.

Figure 7:
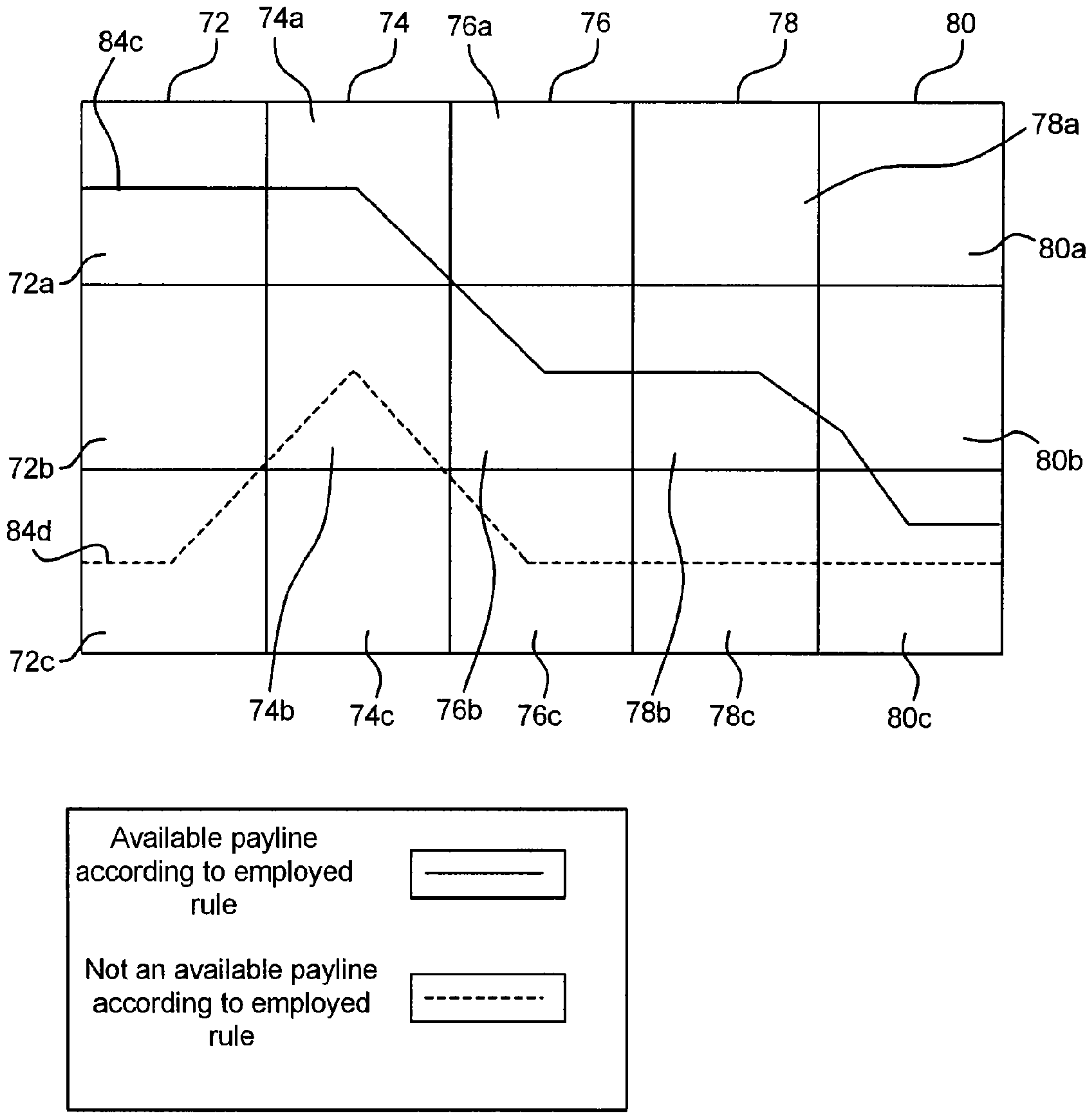
FIG. 7 is an enlarged front plan view showing one embodiment of the present disclosure, wherein the gaming device employs another possible designated rule for determining available paylines.

Referring now to FIG. 7, one embodiment of the gaming device of the present disclosure employs another designated rule to determine active paylines in a game. The gaming device in this example also includes five reels 72, 74, 76, 78, and 80, each of the reels associated with three symbol positions arranged in a plurality of rows and a plurality of columns. In one embodiment, according to the same/lower row payline rule, an available payline must include one symbol position from each of said columns, and any symbol position which is in a column that is adjacent to another symbol position must be on the same row or a lower row.

In FIG. 7, payline 84*c* is shown as a solid line because payline 84*c* is an available payline according to the same/lower row payline rule. That is, payline 84*c* includes one symbol position from each column, and any symbol position which is in an adjacent column as another symbol position is in the same row or a lower row (payline 84*c* includes symbol positions 72*a*, 74*a*, 76*b*, 78*b*, and 80*c*). On the other hand, payline 84*d* is shown as a phantom line because payline 84*d* is not an available payline in the game according to the same/lower row payline rule. An examination of reel 72 and reel 74 shows that symbol position 74*b*, which is in a column that is adjacent to the column including symbol position 72 *c*, is not in the same row or in a lower row as symbol position 72*c*. Thus, the gaming device does not evaluate the symbols generated along payline 84*d* for possible winning symbol combinations.

According to another possible designated rule, an available payline must include one symbol position from each of said columns, and the symbol positions must be situated in a symmetric arrangement. It should be appreciated that the gaming device may employ one or more of the designated rules described above, or any other suitable rule or combination of rules to determine available paylines in the game.

After determining which paylines are available according to the applicable designated rule or rules employed in the game, the gaming device enables a player to wager on one or more of the available paylines. For each available payline wagered on by the player, the gaming device evaluates the symbols generated in the symbol positions defining that payline. The gaming device then determines whether the generated symbols along each of the available, wagered on paylines correspond to any winning symbol combinations and provides any outcome or award associated with such winning symbol combinations to the player.

As described above, adhering to designated rules for determining paylines limits the number of available paylines in the game. This allows for simpler game play and enables a player to more easily determine why they may be provided with an award.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one display device;

at least one input device;

at least one processor; and a memory device which stores a plurality of instructions which, when executed by the at least one processor, cause the at least one processor to operate with the at least one display device and the at least one input device to control each play of a game by:

(a) receiving a wager associated with a number of a plurality of symbol positions associated with a plurality of reels, said number of symbol positions being greater than one and each of the plurality of reels associated with at least three symbol positions;

(b) activating said number of symbol positions;

(c) generating and displaying one of a plurality of symbols in each active symbol position;

(d) identifying each of the symbols in active symbol positions for a first of said plurality of reels and a second of said plurality of reels;

(e) determining if any of said identified symbols for the first reel are related to any of said identified symbols for the second reel;

(f) for any of said identified symbols for the first reel which are not related to any of said identified symbols for the second reel, not forming a string of related symbols;

(g) for each occurrence of determined related symbols:

(i) determining if said related symbols correspond to at least one designated string formation rule, said determination occurring regardless of which of the at least three symbol positions of the first reel in which one of said related symbols is displayed and said determination occurring regardless of which of the at least three symbol positions of the second reel in which another one of said related symbols is displayed, (ii) if the related symbols correspond to said at least one designated string formation rule, forming a string of related symbols, and (iii) if the related symbols do not correspond to said at least one designated string formation rule, not forming a string of related symbols;

(h) for each string of related symbols formed:

(i) determining if any symbols displayed in active symbol positions in an adjacent reel are related to the symbols which form said string of related symbols and correspond to said at least one designated string formation rule, (ii) if any one of said symbols in the adjacent reel is related to the symbols which form said string of related symbols and corresponds to said at least one designated string formation rule, adding said related symbol to said string of related symbols, (iii) if any other of said symbols in the adjacent reel are related to the symbols which form said string of related symbols and correspond to said at least one designated string formation rule, forming an additional string of related symbols for each of the other related symbols, and (iv) if none of said symbols in the adjacent reel are related to the symbols which form said string of related symbols or do not correspond to said at least one designated string formation rule, designating said string of related symbols as complete;

(i) repeating (h) until either each of the strings of related symbols is complete or there are no additional reels adjacent to the last reel which includes one of the related symbols;

(j) providing to a player any awards based on any strings of related symbols which correspond with at least one winning combination of said symbols; and (k) if no strings of related symbols are formed, not providing any awards based on any formed strings of related symbols.

2. The gaming device of claim 1, wherein, when executed by the at least one processor, the plurality of instructions cause the at least one processor to receive one of a plurality of different wagers, wherein each different wager corresponds to a different number of active symbol positions.

3. The gaming device of claim 1, wherein symbols are related if they form part or all of at least one winning combination of said symbols.

4. The gaming device of claim 1, wherein the symbol positions are arranged in a plurality of rows.

5. The gaming device of claim 4, wherein said designated rule requires that related symbols on adjacent reels must be in active symbol positions that are on the same row or adjacent rows to form a string of related symbols.

6. A gaming device comprising:

at least one display device;

at least one input device;

at least one processor; and a memory device which stores a plurality of instructions which, when executed by the at least one processor, cause the at least one processor to operate with the at least one display device and the at least one input device to control each play of a game by:

(a) receiving a wager associated with a number of active symbol positions of a plurality of symbol positions associated with a plurality of reels, said number of active symbol positions being greater than one, wherein said plurality of symbol positions are arranged in at least three rows;

(b) generating and displaying one of a plurality of symbols in each of said number of active symbol positions;

(c) identifying each of the symbols in active symbol positions for a first of said plurality of reels and a second of said plurality of reels;

(d) determining if any of said identified symbols for the first reel are related to any of said identified symbols for the second reel;

(e) for each occurrence of determined related symbols:

(i) determining if the related symbols are in active symbol positions that are in the same row or in adjacent rows, said determination occurring regardless of which of the at least three rows of symbol positions of the first reel in which one of said related symbols is displayed and said determination occurring regardless of which of the at least three rows of symbol positions of the second reel in which another one of said related symbols is displayed, (ii) if the related symbols are in active symbol positions that are in the same row or in adjacent rows, forming a string of related symbols, and (iii) if the related symbols are in active symbol positions that are not in the same row or in adjacent rows, not forming a string of related symbols;

(f) for each string of related symbols formed:

(i) determining if any symbols in active symbol positions associated with an adjacent reel are related to the symbols which form said string of related symbols, (ii) for each symbol in one of the active symbol positions associated with the adjacent reel that is related to the symbols which form said string of related symbols, determining whether said related symbol on said adjacent reel is in one of the active symbol positions which is in the same row or any row adjacent to the string of related symbols, and:

(1) if said related symbol on said adjacent reel is in one of the active symbol positions which is in the same row or any row adjacent to the string of related symbols, adding said related symbol on said adjacent reel to the string of related symbols, and (2) if said related symbol on said adjacent reel is in one of the active symbol positions that is not in the same row or one of the adjacent rows to the string of related symbols, designating the string of related symbols as complete, and (iii) if none of the symbols in the active symbol positions associated with the adjacent reel are related to the string of related symbols, designating the string of related symbols as complete; and (g) providing any awards based on any strings of related symbols which correspond to at least one winning combination of said symbols.

7. The gaming device of claim 6, wherein, when executed by the at least one processor, said plurality of instructions cause the at least one processor to receive one of a plurality of different wagers, wherein each different wager corresponds to a different number of active symbol positions.

8. The gaming device of claim 6, wherein, when executed by the at least one processor, said plurality of instructions cause the at least one processor to receive a wager associated with a number of reels, wherein each of the symbol positions associated with said number of reels are active symbol positions.

9. The gaming device of claim 8, wherein, when executed by the at least one processor, said plurality of instructions cause the at least one processor to receive one of a plurality of different wagers, wherein each different wager corresponds to a different number of reels.

10. The gaming device of claim 6, wherein symbols are related if they form part or all of at least one winning combination of said symbols.

11. A method of operating a gaming device, said method comprising:

(a) providing a plurality of reels including a plurality of symbols, said reels associated with a plurality of symbol positions and each of the plurality of reels associated with at least three symbol positions; and (b) for each play of a game:

(i) receiving a wager associated with a number of said symbol positions greater than one;

(ii) activating said number of symbol positions;

(iii) generating one of said symbols for each active symbol position;

(iv) causing at least one display device to display one of the generated symbols in each active symbol position;

(v) identifying each of the symbols in active symbol positions for a first of said reels and a second of said reels;

(vi) determining if any of said identified symbols for the first reel are related to any of said identified symbols for the second reel;

(vii) for any of said identified symbols for the first reel which are not related to any of said identified symbols for the second reel, not forming a string of related symbols;

(viii) for each occurrence of determined related symbols:

(A) determining if said related symbols correspond to at least one designated string formation rule associated with the game, said determination occurring regardless of which of the at least three symbol positions of the first reel in which one of said related symbols is displayed and said determination occurring regardless of which of the at least three symbol positions of the second reel in which another one of said related symbols is displayed, (B) if the related symbols correspond to said at least one designated string formation rule, forming a string of related symbols, and (C) if the related symbols do not correspond to said at least one designated string formation rule, not forming a string of related symbols;

(ix) for each string of related symbols formed:

(A) determining if any symbols displayed in active symbol positions in an adjacent reel are related to the symbols which form said string of related symbols and correspond to said at least one designated string formation rule, (B) if one of said symbols in the adjacent reel is related to the symbols which form said string of related symbols and corresponds to said at least one designated string formation rule, adding said related symbol to said string of related symbols, (C) if any other of said symbols in the adjacent reel are related to the symbols which form said string of related symbols and correspond to said at least one designated string formation rule, forming an additional string of related symbols for each of the other related symbols, and (D) if none of said symbols in the adjacent reel are related to the symbols which form said string of related symbols or do not correspond to said at least one designated string formation rule, designating said string of related symbols as complete;

(x) repeating (ix) until either each of the strings of related symbols is complete or there are no additional reels adjacent to the last reel which includes one of the related symbols;

(xi) providing any awards based on any strings of related symbols which correspond with at least one winning combination of said symbols; and (xii) if no strings of related symbols are formed, not providing any awards based on any formed strings of related symbols.

12. The method of claim 11, which includes receiving one of a plurality of different wagers, wherein each different wager corresponds to a different number of active symbol positions.

13. The method of claim 11, wherein symbols are related if they form part or all of any winning combination of symbols.

14. The method of claim 11, wherein the symbol positions associated with said reels are arranged in a plurality of rows.

15. The method of claim 14, wherein said at least one designated string formation rule requires that related symbols on adjacent reels must be in active symbol positions that are on the same row or adjacent rows to form a string of related symbols.

16. The method of claim 11, which is provided through a data network.

17. The method of claim 16, wherein the data network is an internet.

18. A method of operating a gaming device, said method comprising:

(a) providing a plurality of reels including a plurality of symbols, said reels associated with a plurality of symbol positions arranged in at least three rows;

(b) for each play of a game:

(i) receiving a wager associated with a number of active symbol positions;

(ii) generating one of said symbols for each of said number of active symbol positions;

(iii) causing at least one display device to display one of said generated symbols in each of said number of active symbol positions;

(iv) identifying each of the symbols in active symbol positions for a first one of said reels and a second one of said reels;

(v) determining if any of said identified symbols for the first reel are related to any of said identified symbols for the second reel, (vi) for each occurrence of determined related symbols:

(A) determining if the related symbols are in active symbol positions that are in the same row or in adjacent rows, said determination occurring regardless of which of the at least three rows of symbol positions of the first reel in which one of said related symbols is displayed and said determination occurring regardless of which of the at least three rows of symbol positions of the second reel in which another one of said related symbols is displayed, (B) if the related symbols are in active symbol positions that are in the same row or in adjacent rows, forming a string of related symbols, and (C) if the related symbols are in active symbol positions that are not in the same row or in adjacent rows, not forming a string of related symbols;

(vii) for each string of related symbols formed:

(A) determining if any symbols in active symbol positions associated with an adjacent reel are related to the symbols which form said string of related symbols, (B) for each symbol in one of the active symbol positions associated with the adjacent reel that is related to the symbols which form said string of related symbols, determining whether said related symbol on said adjacent reel is in one of the active symbol positions which is in the same row or any row adjacent to the string of related symbols, and:

(1) if said related symbol on said adjacent reel is in one of the active symbol positions which is in the same row or any row adjacent to the string of related symbols, adding said related symbol on said adjacent reel to the string of related symbols, and (2) if said related symbol on said adjacent reel is in one of the active symbol positions that is not in the same row or one of the adjacent rows to the string of related symbols, designating the string of related symbols as complete, and (C) if none of the symbols in the active symbol positions associated with the adjacent reel are related to the string of related symbols, designating the string of related symbols as complete; and (viii) providing any awards based on any strings of related symbols which correspond to at least one winning combination of said symbols.

19. The method of claim 18, which includes receiving one of a plurality of different wagers, wherein each different wager corresponds to a different number of active symbol positions.

20. The method of claim 18, which includes receiving a wager associated with a number of reels, wherein each of the symbol positions associated with said number of reels are active symbol positions.

21. The method of claim 20, which includes receiving one of a plurality of different wagers, wherein each of said different wagers corresponds to a different number of reels.

22. The method of claim 18, wherein symbols are related if they form part or all of any winning combination of symbols.

23. The method of claim 18, which is provided through a data network.

24. The method of claim 23, wherein the data network is an internet.

* * * * *

UNITED STATES PATENT AND TRADEMARK OFFICE

CERTIFICATE OF CORRECTION

PATENT NO. : 8,241,104 B2
APPLICATION NO. : 11/556927
DATED : August 14, 2012
INVENTOR(S) : Bryan D. Wolf It is certified that error appears in the above-identified patent and that said Letters Patent is hereby corrected as shown below:

IN THE CLAIMS

In Claim 3, Column 31, Line 66, between "of" and "at" insert --any of the--.
In Claim 5, Column 32, Line 3, after "designated" insert --string formation--.
In Claim 5, Column 32, Line 5, replace "the" with --a--.
In Claim 6, Column 32, Line 33, replace "the" with --a--.
In Claim 10, Column 33, Line 28, between "of" and "at" insert --any of the--.
In Claim 11, Column 33, Line 39, between "of" and "symbol" insert --said--.
In Claim 13, Column 34, Line 43, replace "any" with --the at least one-- and between "of" and "symbols" insert --said--.
In Claim 15, Column 34, Line 49, replace "the" with --a--.
In Claim 18, Column 34, Line 59, after "rows;" insert --and--.
In Claim 18, Column 35, at about Line 9, replace "the same" with --a same--.
In Claim 22, Column 36, at about Line 30, between "any" and "winning" insert --of the at least one-- and between "of" and "symbols" insert --said--.

Signed and Sealed this
Thirtieth Day of April, 2013

Teresa Stanek Rea
*Acting Director of the United States Patent and Trademark Office*